US012193037B2

(12) United States Patent
Hedayat et al.

(10) Patent No.: US 12,193,037 B2
(45) Date of Patent: Jan. 7, 2025

(54) METHODS AND APPARATUS FOR SUPPORTING WIRELESS MEDIUM SHARING

(71) Applicant: Charter Communications Operating, LLC, St. Louis, MO (US)

(72) Inventors: Ahmad Reza Hedayat, Carlsbad, CA (US); Maulik Vaidya, Escondido, CA (US); Amitav Mukherjee, Elk Grove, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/432,019

(22) Filed: Feb. 4, 2024

(65) Prior Publication Data

US 2024/0237041 A1 Jul. 11, 2024

Related U.S. Application Data

(63) Continuation of application No. 17/681,835, filed on Feb. 27, 2022, now Pat. No. 11,895,682, which is a continuation of application No. 16/864,072, filed on Apr. 30, 2020, now Pat. No. 11,265,882.

(51) Int. Cl.
*H04W 72/53* (2023.01)
*H04W 72/0446* (2023.01)
*H04W 72/23* (2023.01)
*H04W 84/12* (2009.01)

(52) U.S. Cl.
CPC ....... *H04W 72/53* (2023.01); *H04W 72/0446* (2013.01); *H04W 72/23* (2023.01); *H04W 84/12* (2013.01)

(58) Field of Classification Search
CPC . H04W 72/53; H04W 72/23; H04W 72/0446; H04W 84/12
See application file for complete search history.

(56) References Cited

U.S. PATENT DOCUMENTS

2021/0136735 A1* 5/2021 Lin ..................... H04W 72/121
2021/0235319 A1* 7/2021 Huang ................. H04L 1/0009
2021/0315009 A1* 10/2021 Xia ......................... H04W 8/04

* cited by examiner

*Primary Examiner* — Melvin C Marcelo
(74) *Attorney, Agent, or Firm* — Straub & Straub; Michael P. Straub; Stephen T. Straub

(57) ABSTRACT

Methods and apparatus for supporting wireless medium sharing in wireless communications systems, e.g., various 802.11 wireless communications systems, are described. A novel shared transmission type of trigger frame is implemented, which allows a wireless station, acting as a host station, to make available transmission resources, which have been acquired by the wireless station, to one or more guest stations. A shared transmission type of trigger frame, generated and transmitted by the host station communicates information identifying the attributes of a corresponding trigger based (TB) frame, information identifying resources of the TB frame to be used by the host station and information identifying one or more set of shared resources which may be used by guest station(s). The trigger based (TB) frame, corresponding to the transmitted shared transmission type trigger frame, is used by the host station and one or more guest stations to transmit data to an access point.

20 Claims, 29 Drawing Sheets

| TRIGGER TYPE SUBFIELD VALUE | TRIGGER FRAME VARIANT |
|---|---|
| 0 | BASIC |
| 1 | BEAMFORMING REPORT POLL (BFRP) |
| 2 | MU-BAR |
| 3 | MU-RTS |
| 4 | BUFFER STATUS REPORT POLL (BSRF) |
| 5 | GCR MU-BAR |
| 6 | BANDWIDTH QUERY REPORT POLL (BQRP) |
| 7 | NDP FEEDBACK REPORT POLL (NFRP) |
| 8-15 | RESERVED |

TRIGGER TYPE SUBFIELD ENCODING

TRIGGER FRAME FORMAT

USER INFO FIELD FORMAT

| FIGURE 28A | FIGURE 28B | FIGURE 28C |

METHODS AND APPARATUS FOR SUPPORTING WIRELESS MEDIUM SHARING

RELATED APPLICATIONS

The present application is a continuation of U.S. patent application Ser. No. 17/681,835 filed Feb. 27, 2022 which published as U.S. patent publication US 2022-0191870 A1 on Jun. 16, 2022 which is a continuation of U.S. patent application Ser. No. 16/864,072 filed Apr. 30, 2020 which published as U.S. patent publication US 2021-0345339 A1 on Nov. 4, 2021 and issued as U.S. Pat. No. 11,265,882 with the above listed patent applications and patent publications being hereby expressly incorporated by reference in their entirety.

FIELD

The present application relates to communications methods and apparatus, and more particularly, to wireless medium sharing methods and apparatus for traffic, e.g., low latency uplink traffic such as 802.11 uplink traffic.

BACKGROUND

The next generation 802.11/WiFi technology, 802.11be, is under development. The main candidate features that have been discussed are: larger bandwidth (e.g., 320 MHz) and more efficient utilization of non-contiguous spectrum, Multi-band/multi-channel aggregations and operation, 16 spatial streams and Multiple Input Multiple Output (MIMO) protocols enhancements, Multi-Access Point (AP) Coordination (e.g., coordinated and joint transmission), Enhanced link adaptation and retransmission protocol (e.g., Hybrid Automatic Repeat Request (HARQ)), and if needed, adaptation to regulatory rules to 6 GHz spectrum.

The 802.11be project definition is as follows: "New high-throughput, low latency applications will proliferate such a virtual reality or augmented reality, gaming, remote office and cloud computing (e.g., latency lower than 5 ms for real-time gaming). With the high throughput and stringent real-time delay requirements of these applications, users expect enhanced throughput, enhanced reliability, reduced latency and jitter, and improved power efficiency in supporting their applications over WLAN."

802.11 technologies are prone to channel access delay and variation in channel access delay, i.e., jitter. This makes 802.11/WiFi undesirable for low-latency applications such as gaming, virtual reality (VR) applications, etc.

With new 11ax/be features, especially multi-link and multi-band aggregation, there is an opportunity to tackle the channel access issue that 802.11 technologies have had.

In all 802.11 formats, there exist legacy PHY header (Legacy-Short Training Field (L-STF), Legacy-Long Training (L-LTF), Legacy-Signal (L-SIG)), originated from the first WiFi generation; 802.11a. All future versions of 802.11, in 2.4/5/6 GHz, recognize this header and defer to the framework that follows it.

FIG. 1 includes a drawing of an 802.11a message 102 illustrating message format also referred to as non-High Throughput (non-HT) format. The 802.11a non-HT message 102 includes a L-STF field, a L-LTF field, a L-SIG field, a service field (16 bits), a Physical Layer Convergence Procedure (PLCP) Service Data Unit (PSDU) field, a 6-Ngg Tail bits field, and a Pad bits field. The service field (16 bits), PSDU field, 6-Ngg Tail bits field, Pad bits field are part of the DATA portion of the message 102.

Newer generations after 11a, also search for indications after the legacy header to identify if what follows is 11n/ac/ax/be.

FIG. 1 further includes a drawing of an 802.11ac message 104 illustrating message Very High Throughput (VHT) format. The 802.11ac (VHT format) message 104 includes a L-STF field of duration TSHORT, a L-LTF field of duration TLONG, a L-SIG field of duration TSIGNAL, a VHT-SIG-A field of 8 micro-sec duration, a VHT-LTF field, with each VHT-LTF symbol having a duration of 4 micro-sec, a VHT-SIG-B field of 4 micro-sec, a service field (16 bits), a PSDU field, and a Pad bits field, and a 6-Ngg Tail bits field. The service field (16 bits), PSDU field, Pad bits field are part of the DATA (non-LDCP case only) portion of the message 104.

FIG. 2 is a drawing 200 illustrating various 802.11ax (High Efficiency (HE) FORMATS). Drawing 200 of FIG. 2 includes an 802.11ax message 2002 illustrating HE Single User (SU) Format PLPC Protocol Data Unit (PPDU). The 802.11ax HE SU Format PPDU message 202 includes a L-STF field of 8 micro-sec duration, a L-LTF field of 8 micro-sec duration, a L-SIG field of 4 micro-sec duration, a Repeated Legacy-Signal (RL-SIG) field of 4 micro-sec duration, a HE-SIG-A field of 8 micro-sec duration, a HE-STF field of 4 micro-sec duration, and a field of HE-LTF symbols of variable durations per HE-LTF symbol, a data field, and a Packet Extension (PE) field. The LTF-STF field, L-LTF field and L-SIG field are included in the legacy preamble portion of the message 202. The RL-SIG field, the HE-SIG-A field, the HE-STF field and the field of HE-LTF symbols are included in the HE preamble portion of the message 202. The data field and PE field are included in the DATA portion of the message 202.

Drawing 200 of FIG. 2 further includes an 802.11ax message 204 illustrating HE extended range SU Format PPDU. The 802.11ax HE Extended Range SU Format PPDU message 204 includes a L-STF field of 8 micro-sec duration, a L-LTF field of 8 micro-sec duration, a L-SIG field of 4 micro-sec duration, a RL-SIG field of 4 micro-sec duration, a HE-SIG-A field of 16 micro-sec duration, a HE-STF field of 4 micro-sec duration, and a field of HE-LTF symbols of variable durations per HE-LTF symbol, a data field, and a PE field. The LTF-STF field, L-LTF field and L-SIG field are included in the legacy preamble portion of the message 204. The RL-SIG field, the HE-SIG-A field, the HE-STF field, and the field of HE-LTF symbols are included in the HE preamble portion of the message 204. The data field and PE field are included in the DATA portion of the message 204.

Drawing 200 of FIG. 2 further includes an 802.11ax message 206 illustrating HE Trigger Based (TB) Format PPDU. The 802.11ax HE TB Format PPDU message 206 includes a L-STF field of 8 micro-sec duration, a L-LTF field of 8 micro-sec duration, a L-SIG field of 4 micro-sec duration, a RL-SIG field of 4 micro-sec duration, a HE-SIG-A field of 8 micro-sec duration, a HE-STF field of 8 micro-sec duration, and a field of HE-LTF symbols of variable durations per HE-LTF symbol, a data field, and a PE field. The LTF-STF field, L-LTF field and L-SIG field are included in the legacy preamble portion of the message 206. The RL-SIG field, the HE-SIG-A field, the HE-STF field, and the field of HE-LTF symbols are included in the HE preamble portion of the message 206. The data field and PE field are included in the DATA portion of the message 206.

Drawing 200 of FIG. 2 further includes an 802.11ax message 208 illustrating HE Multi-User (MU) Format PPDU. The 802.11ax HE MU Format PPDU message 208 includes a L-STF field of 8 micro-sec duration, a L-LTF field of 8 micro-sec duration, a L-SIG field of 4 micro-sec duration, a RL-SIG field of 4 micro-sec duration, a HE-SIG-A field of 8 micro-sec duration, a HE-SIG-B field with each symbol having a duration of 4 micro-sec, a HE-STF field of 4 micro-sec duration, and a field of HE-LTF symbols of variable durations per HE-LTF symbol, a data field, and a PE field. The LTF-STF field, L-LTF field and L-SIG field are included in the legacy preamble portion of the message 208. The RL-SIG field, the HE-SIG-A field, HE-SIG-B field, the HE-STF field, and the field of HE-LTF symbols are included in the HE preamble portion of the message 208. The data field and PE field are included in the DATA portion of the message 208.

In the 802.11ax PHY layer header symbols: i) the HE-STF training symbol field allows receivers to synchronize to the timing and frequency of the incoming frame before decoding the packet body; and ii) the HE-LTF is important for channel estimation, enabling beamforming and MIMO spatial diversity.

While 802.11be is under development, it is expected to have similar STF/LTF symbols.

In 802.11ax, multi-user UL transmission is enabled by exchanging of Trigger frame (from an access point (AP)) and transmission by identified/responding stations (STAs). This is shown in drawing 700 of FIG. 7. Drawing 700 of FIG. 7 includes a vertical axis 702 representing frequency, and a horizontal axis 704 representing time. Trigger frame 706 is sent (transmitted) by the AP in the downlink. Trigger based (TB) PPDUs 708 are send by STAs in the uplink including data for one or more STAs (data for STA 1 712, data for STA 2 714, . . . , data for STA m) 716. ACKs 710 are sent by the AP in the downlink.

FIG. 6 is a table 600 showing a few identified varieties of trigger frames and the Trigger Type subfield encoding corresponding to each type of trigger frame. First column 602 of table 600 lists trigger type subfield value and second column 604 of table 600 lists trigger frame variant. A Trigger Type subfield value of 0 indicates Basic. A Trigger Type subfield value of 1 indicates Beamforming Report Poll (BFRP). A Trigger Type subfield value of 2 indicates MU-BAR. A Trigger Type subfield value of 3 indicates MU-RTS. A Trigger Type subfield value of 4 indicates Buffer Status Report Poll (BSRP). A Trigger Type subfield value of 5 indicates GCR MU-BAR. A Trigger Type subfield value of 6 indicates Bandwidth Query Report Poll (BQRP). A Trigger Type subfield value of 7 indicates NDP Feedback Report Poll (NFRP). Trigger Type Subfield values of 8-15 are reserved.

FIG. 3 is a drawing 300 illustrates fields in a Trigger frame format message 302 and the corresponding number of bits 304 for each field. The Trigger frame format message 302 includes a MAC header 300, which includes a frame control field of 2 octets of bits, a duration field of 2 octets of bits, a RA field of 6 octets of bits, and a TA field of 6 octets of bits. The trigger frame format message 302 further includes a Common Info field of 8 or more octets of bits, a User Info field of variable length, a padding field of variable length and a FCS field of 4 octets of bits.

FIG. 4 is a drawing 400 which illustrates fields within Common Field 402 of the Trigger frame format message 302, the corresponding number of bits 304 for each field within the Common Field 402, and the corresponding bit designations 406 for each field within the Common field. The Common field 402 includes a trigger type field of 4 bits (B0 . . . B3), a UL field of 12 bits (B4 . . . B15), a MORE TF field of 1 bit (B16), a CS Required field of 1 bit (B17), an UL BW field of 2 bits (B18, B19), a GI and HE-LTF type field of 2 bits (B20, B21), a MU-MIMO HE-LTF mode field of 1 bit (B22) and a number of He-LTF symbols and mid-amble periodicity field of 3 bits (B23 . . . B25), an UL STBC field of 1 bit (B26), a LPDC extra symbol SEG. field of 1 bit (B27), and AP TX power field of 6 bits (B28 . . . B 33), a pre-FEC padding factor field of 2 bits (B34 . . . B35), a PE Dis-ambiguity filed of 1 bit (B36), and UL spatial Rouse field of 16 bits (B37 . . . B52), a Doppler field of 1 bit (B53), an UL He-SAG-A2 field of nine bits (B54 . . . B63), a Reserved field of 1 bit (B63) and a trigger dependent common info field of variable length.

FIG. 5 is a drawing 500 which illustrates fields within User Info Field 502 of the Trigger frame format message 302, the corresponding number of bits 504 for each field within the User Info Field 502, and the corresponding bit designations 506 for each field within the User Info field. The User Info field 502 includes an AID12 field of 12 bits (B0 . . . B11), a RU Allocation field of 8 bits (B12 . . . B19), an UL FEC Coding Type field of 1 bit (B20), an UL HE-MCS field of 4 bits (B21 . . . B24), an UL DCM field of 1 bit (B25), a SS Allocation/RA RU information field of 6 bits (B26 . . . B31), an UL target RSSI field of 7 bits (B32 . . . B38), a Reserved field of 1 bit (B39) and a Trigger Defendant User Info field of variable length.

Within the trigger frame format, the "Common info" is applicable to the whole upcoming trigger-based (TB) frame. For the individual resource portions assigned to a STA, the separate field "USER Info List" is used.

As described above with the high throughput and stringent real-time delay requirements of many new and expected future applications, users expect enhanced throughput, enhanced reliability, reduced latency and jitter, and improved power efficiency in supporting their applications. Current 802.11 technologies are prone to channel access delay and variation in channel access delay, i.e. jitter. This makes current 802.11/WiFi undesirable for low-latency applications such as gaming, virtual reality (VR) applications, etc.

Based on the above, there is a need for new methods and apparatus to improve 802.11/WiFi wireless communications particularly with regard to low-latency applications.

SUMMARY

Methods and apparatus for supporting wireless medium, e.g., wireless spectrum, sharing in wireless communications systems, e.g., various 802.11 wireless communications systems such as 802.11be wireless communications systems, are described. Various methods and apparatus are well suited for use with low latency applications. A novel shared transmission type of trigger frame is implemented, which allows a wireless station, acting as a host station, to make available transmission resources, which have been acquired by the wireless station, to one or more guest stations. A shared transmission type of trigger frame, generated and transmitted by the host station communicates information identifying the attributes of a corresponding trigger based (TB) frame, information identifying resources of the TB frame to be used by the host station and information identifying one or more set of shared resources which may be used by guest station(s). The trigger based (TB) frame, corresponding to the transmitted shared transmission type trigger frame, is used by the host station and one or more guest stations to transmit data to an access point. At different times the same wireless station may act as a host station or a guest station.

Thus, host station may and sometimes does, make available, unused frequency-time resources, in the set of frequency channels it has acquired, to one or more guest stations, which may need those resources to maintain low latency application(s) running on the guest stations. The shared resource type trigger frame/TB frame approach, in accordance with an exemplary embodiment, provides an efficient mechanism for rapidly reallocating air link resources among a plurality of wireless stations. An individual wireless station may act as a host station during some time intervals and act as a guest station during other time intervals.

An exemplary method of operating a first wireless station, in accordance with some embodiments, comprises: during a first time period, operating the first wireless station to act as a host station, operating as a host station including: making a decision to make one or more transmission resources acquired by the first wireless station available for use by one or more other wireless stations a during a first frame time period; transmitting a first trigger frame including a type indicator indicating that the trigger frame is a shared transmission type of trigger frame and information identifying one or more sets of shared resource units; and transmitting a first trigger based (TB) frame corresponding to the first trigger frame, said first trigger based frame including a plurality of resource units, transmitting the first trigger based frame including transmitting energy on some but not all of the resource units in said first trigger based frame.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

DETAILED DESCRIPTION

Medium sharing in uplink (UL) in accordance with various embodiment of the present invention will now be described. The principle of various embodiments, in accordance with the present invention, are based on medium sharing between stations (STAs) and AP/STAs. The medium sharing generally happens during a Transmission Opportunity (TXOP) (or Channel occupancy Time (COT)). The details described here are regarding the STAs behaviors during TXOP establishment and during frame transmission. The main aspect here is that a host STA initiates an UL transmission (either in a series of frames, i.e., a TXOP, or in a single frame) and a subset of resources are left unused for other guest STSs, e.g., with urgent and low latency (LL) traffic.

In 802.11ax and 802.11be, STAs are capable of transmitting trigger based (TB) frames after receiving a trigger from their own AP. In various embodiments, in accordance with the present invention, using this capability, additional novel STA and AP behaviors are implemented to enable medium sharing with a frame.

Note, in subsequent embodiments, symbols such as HE-SIG-A, HE-SIG-B, HE-STF and HE-LTF are named in reference to 802.11ax frame structure. However, for 802.11be, other prefixes such as ET may be used, e.g. ET-STF, etc.

Figure 8:
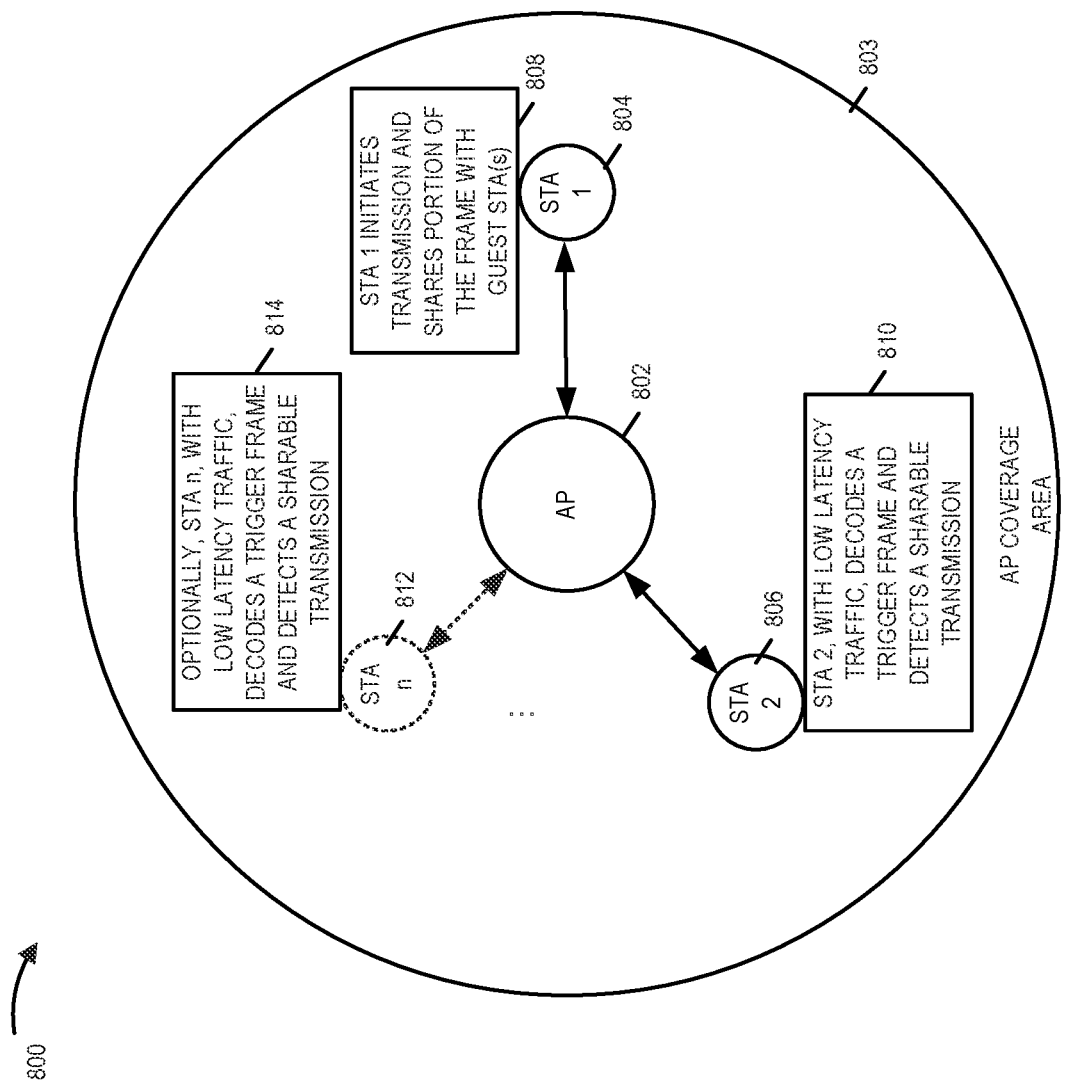
FIG. 8 is a drawing illustrating medium sharing in UL transmission in accordance with an exemplary embodiment.

FIG. 8 is a drawing 800 illustrating medium sharing in UL transmission in accordance with an exemplary embodiment. Drawing 800 includes an access point (AP) 802 with a corresponding coverage area 803, and a plurality of stations (STAs) including a host STA, which is STA 1 804, and guest STAs including STA 2 806, and, optionally additional guest STAs, e.g., STA n 812. STA 1 804 initiates transmission and shares portion of the frame with guest STA(s), as indicated by block 808. STA 2 806, with low latency traffic, decodes a trigger frame, which was transmitted by STA 1 804, and detects a sharable transmission, as indicated by block 810. Optionally STA n 812, with low latency traffic, decodes the trigger frame, which was transmitted by STA 1 804, and detects a sharable transmission, as indicated by block 814.

A first exemplary embodiment of medium sharing in UL transmission will now be described. A host STA initiates UL transmission but transmits no energy on a subset of resources. The leftover resources may be, and sometimes are, used by other guest STAs, e.g., guest STA with low latency (LL) traffic, and may be of the following forms a subset of spatial streams, a subset of OFDMA resource units (RU), or both.

To announce such transmission, a trigger frame followed by trigger-based (TB) frame mechanism is used, with specific behavior by host/guest STAs and AP which are outlined in the following. The host STA may and sometimes does, transmit a trigger frame identifying: i) the type of trigger, wherein type is: Trigger frame variant=Shared Transmission, value=8 (see row 906 of Trigger Type Subfield encoding table 900 of FIG. 9); and ii) a list of left over frequency resources (e.g., set of RUs or 20 MHz sub-bands unused by the host STA). In some embodiments, this list is specified in an additional User Info field (see guest info 1 1010, . . . guest info m 1012 of user info list 1006 of trigger frame format 1010 of FIG. 10). Alternatively, there may be only one "User info" which is the Host info (see host info 1008 of trigger frame format 1010 of FIG. 10). the RUs listed in the Host info are the only RUs used by the host STA, and the remaining RUs (out of all possible RUs) are the shared RUs, available for one or more guest STA. The MCS to be used for the leftover RUs may also be, and sometimes are, specified by the host STA. If none are specified it is assumed by the guest STAs and the AP that the same MCS as the one used by the host STA (for its own RUS) is used.

The PHY header attributes of the next TB frame, e.g. SIG-A and especially the number of LTF symbols (e.g., HE LTF) can be obtained from the common info field of the trigger frame.

The host STA transmits the TB frame and does not transmit in the leftover RU (identified in the trigger frame.

Figure 9:
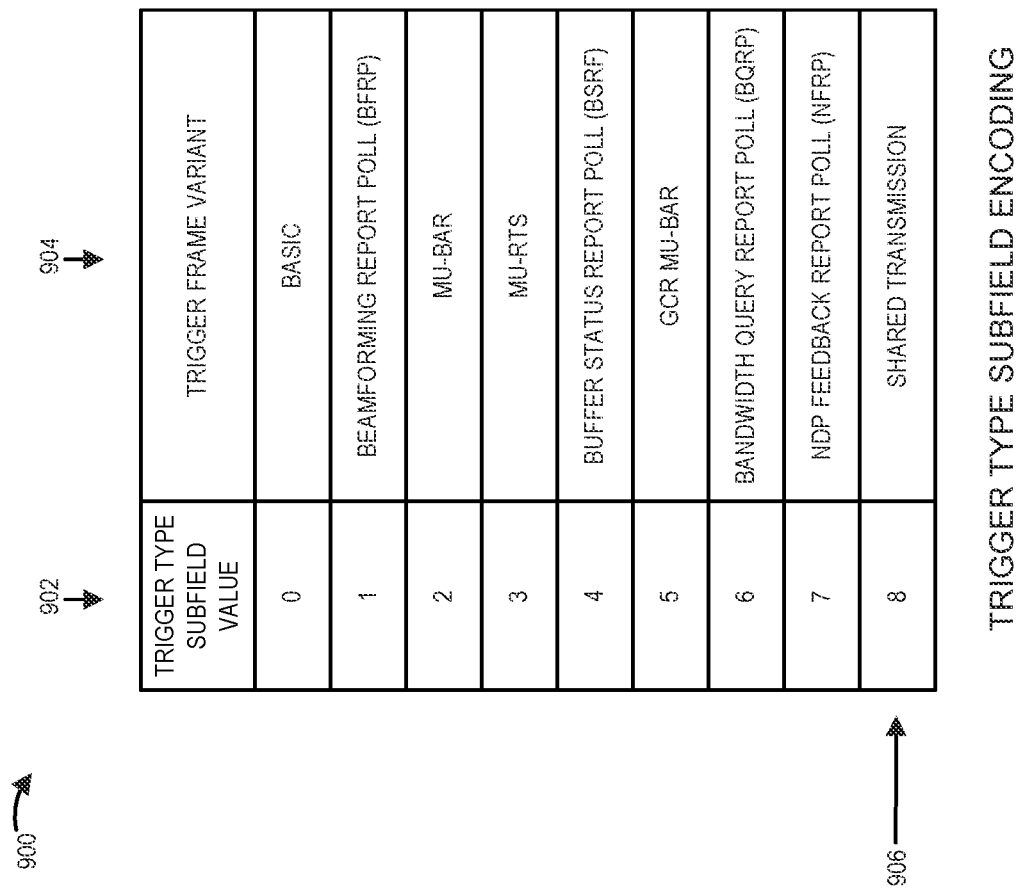
FIG. 9 is a table including a list of different trigger frames and the Trigger Type subfield encoding corresponding to each type of trigger frame, said list of different trigger frame times including a Shared Transmission Trigger Frame type, in accordance with an exemplary embodiment.

FIG. 9 is a table 900 showing identified varieties of trigger frames and the Trigger Type subfield encoding corresponding to each type of trigger frame in accordance with an exemplary embodiment. First column 902 of table 900 lists trigger type subfield value and second column 904 of table 900 lists trigger frame variant. A Trigger Type subfield value of 0 indicates Basic. A Trigger Type subfield value of 1 indicates Beamforming Report Poll (BFRP). A Trigger Type subfield value of 2 indicates MU-BAR. A Trigger Type subfield value of 3 indicates MU-RTS. A Trigger Type subfield value of 4 indicates Buffer Status Report Poll (BSRP). A Trigger Type subfield value of 5 indicates GCR MU-BAR. A Trigger Type subfield value of 6 indicates Bandwidth Query Report Poll (BQRP). A Trigger Type subfield value of 7 indicates NDP Feedback Report Poll (NFRP). Row 906 indicates that a trigger type subfield value of 8 indicates Shared Transmission.

Figure 10:
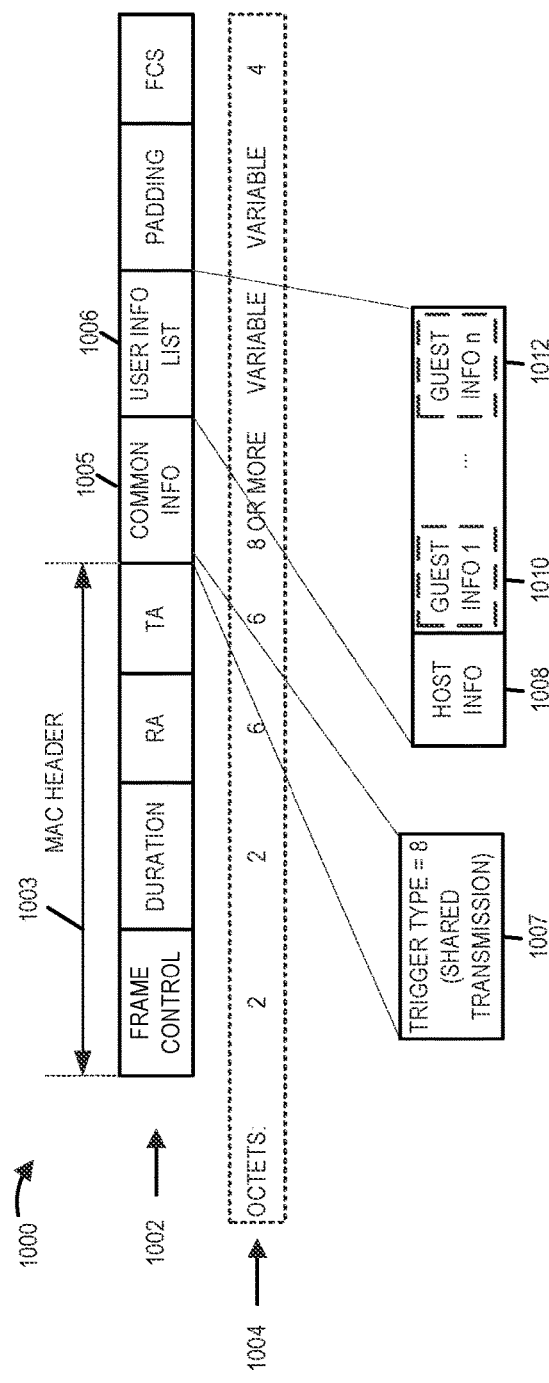
FIG. 10 is a drawing illustrating fields in an exemplary Trigger frame format message in accordance with an exemplary embodiment, and the corresponding number of bits for each field of the trigger frame.

FIG. 10 is a drawing 1000 illustrates fields in an exemplary Trigger frame format message 1002, in accordance with an exemplary embodiment, and the corresponding number of bits 1004 for each field. The Trigger frame format message 1002 includes a MAC header 1000, which includes a frame control field of 2 octets of bits, a duration field of 2 octets of bits, a RA field of 6 octets of bits, and a TA field of 6 octets of bits. The trigger frame format message 1002 further includes a Common Info field 1005 of 8 or more octets of bits, a User Info field 1006 of variable length, a padding field of variable length and a FCS field of 4 octets of bits.

Common Info field 1005 a trigger type subfield field 1007 including a trigger type value of 8 indicating "Shared Transmission".

User info list field 1006 includes a host information field 1008, and in some embodiments, includes one or more guest information fields (guest info 1 field 1010, . . . , guest info n field 1012).

Figure 11:
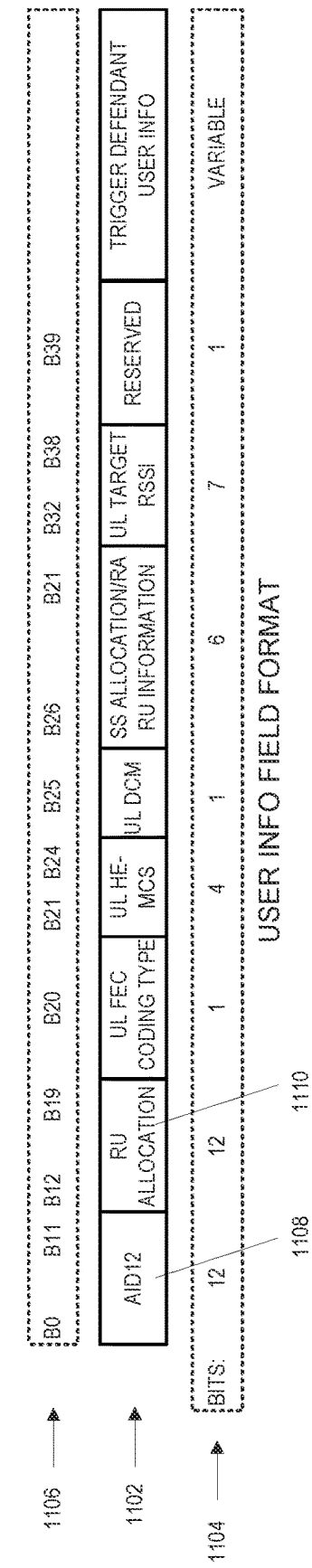
FIG. 11 is drawing illustrating a User Info field format for a User Info field within a User Info List field within a Trigger Frame message, in accordance with an exemplary embodiment, the corresponding number of bits for each field within the user info field, and the corresponding bit designations for each field within the User Info field.

FIG. 11 is drawing 1100 illustrating User Information field format 1102 for a User Info field within a user info list field within a Trigger Frame message, in accordance with an exemplary embodiment, the corresponding number of bits 1004 for each field within the user info field, and the corresponding bit designations 1106 for each field within the User Info field. Exemplary User Info fields, for which the User Info field format is used, include, e.g., host info field 1008, guest info 1 field 1010 and guest info n field 1012.

FIG. 11 is a drawing 1100 which illustrates fields within User Info Field 1102 of the Trigger frame format message 1002, the corresponding number of bits 1104 for each field within the User Info Field 1102, and the corresponding bit designations 1106 for each field within the User Info field. The User Info field 1102 includes an Association ID12 (AID12) field 1108 of 12 bits (B0 . . . B11), a RU Allocation field 1110 of 8 bits (B12 . . . B19), an UL FEC Coding Type field of 1 bit (B20), an UL HE-MCS field of 4 bits (B21 . . . B24), an UL DCM field of 1 bit (B25), a SS Allocation/RA RU information field of 6 bits (B26 . . . B31), an UL target RSSI field of 7 bits (B32 . . . B38), a Reserved field of 1 bit (B39) and a Trigger Defendant User Info field of variable length.

Figure 12:
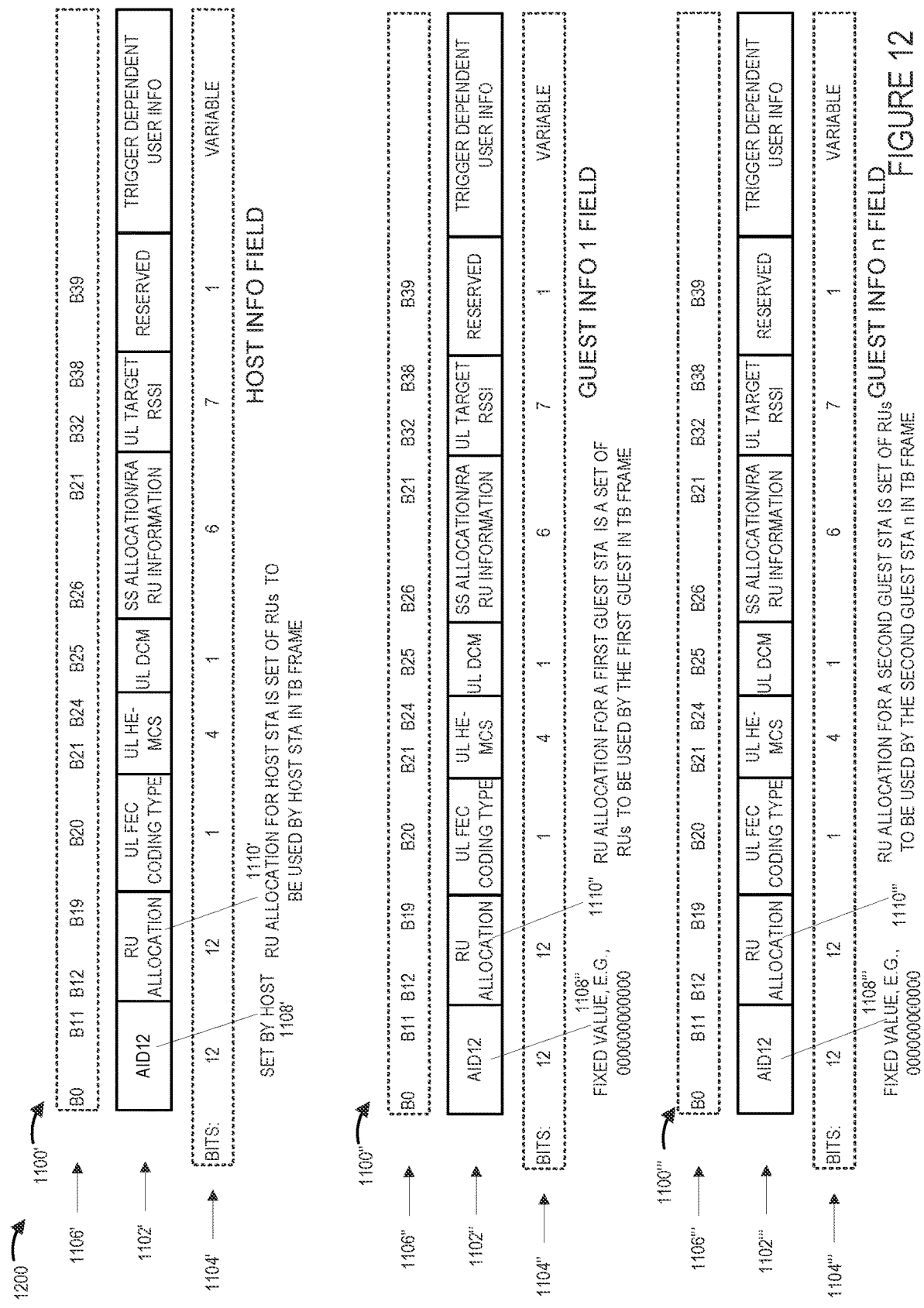
FIG. 12 is a drawing which illustrates exemplary User Information fields for an example in which a Trigger Frame, which is generated and transmitted by a host STA includes a trigger type value=8 signifying "Shared Transmission", and the User Info list field of the Trigger Frame includes a Host Information field, a Guest Information 1 field and a Guest Information n field, in accordance with an exemplary embodiment.

FIG. 12 is a drawing 1200 which illustrates exemplary user information fields for an example in which a trigger message, which is generated and transmitted by a host STA includes a trigger type value=8 (which is part of the common information field (bits B0-B3)) of trigger frame message in accordance with the format of 1002, and the user info list 1006 includes host information 1008, guest information 1 1010 and guest information n 1012. Drawing 1200 includes drawing 1100' representing the host information field 1008, drawing 1100" representing guest information 1 1010 field, and drawing 1100'" representing guest information n field 1012.

Drawing 1100' which illustrates fields within User Info Field 1102' (representing host info field 1008) of the Trigger frame format message 1002, the corresponding number of bits 1104' for each field within the User Info Field 1102', and the corresponding bit designations 1106' for each field within the User Info field. The value of the AID12 field 1108' is set by the host STA, e.g., the 12 least significant bits of the association identifier of the host STA. The value of RU allocation filed 1110' includes the RU allocation for the host STA and identifies a set of RUs to be used by the host STA in the TB frame.

Drawing 1100" which illustrates fields within User Info Field 1102" (representing guest info 1 field 1010) of the Trigger frame format message 1002, the corresponding number of bits 1104' for each field within the User Info Field 1102, and the corresponding bit designations 1106' for each field within the User Info field. The value of the AID12 field 1108" is set, by the host STA, to a fixed value, e.g. 000000000000, to indicate availability for guest STAs. The value of RU allocation filed 1110" includes the RU allocation for a first guest STA and identifies a set of RUs to be used by the first guest STA in the TB frame. Note that some of the fields within User Info Field 1102" (representing guest info 1 field 1010) may be left as reserved values, since the guest STA does not have enough information about the guest STAs to provide reasonable values. Alternatively, a subset of the fields in User Info Field 1102" may be provided by the guest STA.

Drawing 1100'" which illustrates fields within User Info Field 1102'" (representing guest info 2 field 1012) of the Trigger frame format message 1002, the corresponding number of bits 1104" for each field within the User Info Field 1102, and the corresponding bit designations 1106" for each field within the User Info field. The value of the AID12 field 1108'" is set by the host STA to a fixed value, e.g. 000000000000, to indicate availability for guest STAs. The value of RU allocation field 1110'" includes the RU allocation for a second guest STA and identifies a set of RUs to be used by the second guest STA in the TB frame. Note that some of the fields within User Info Field 1102'" (representing guest info 2 field 1012) may be left as reserved values, since the guest STA does not have enough information about the guest STAs to provide reasonable values. Alternatively, a subset of the fields in User Info Field 1102'" may be provided by the guest STA.

In some embodiments, the first guest STA is different than the second guest STA. Thus in some embodiments, a guest STA is only allowed to use one set of guest STA resources.

In some embodiments, the first and second guest STA can be, and sometimes is the same guest STA. Thus, in some embodiments, a guest STA is allowed to use multiple sets of guest resources which the host STA has indicated to be available.

Figure 13:
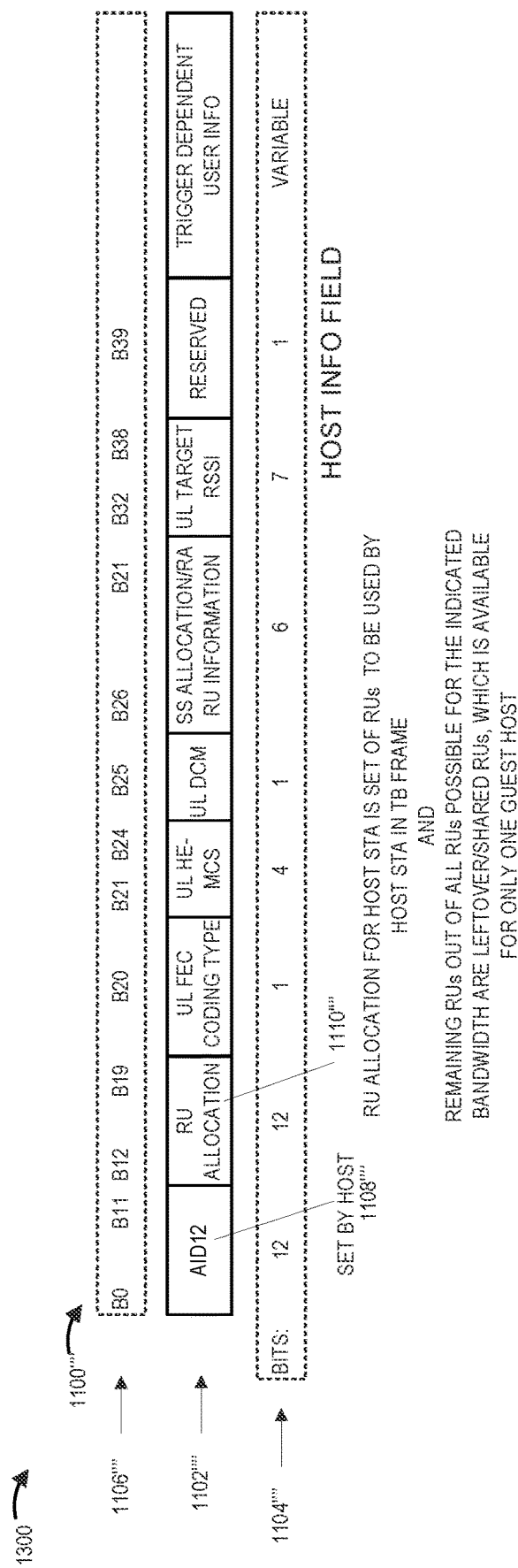
FIG. 13 is a drawing which illustrates an exemplary User Information field for an example in which a Trigger Frame, which is generated and transmitted by a host STA includes a trigger type value=8 signifying "Shared Transmission" and the User Info List field includes a Host Information field but does not include any Guest Info Fields, indicating that the resources units (RUs) which are not being used by the Host STA may be used by a single guest STA, in accordance with an exemplary embodiment.

FIG. 13 is a drawing 1300 which illustrates exemplary user information field for an example in which a trigger message, which is generated and transmitted by a host STA includes a trigger type value=8 (which is part of the common information field (bits B0-B3)) of trigger frame message in accordance with the format of 1002"", and the user info list 1006 includes host information 1008. Drawing 1300 includes drawing 1100"" representing the host information field 1008. In this exemplary embodiment, there may only be one "User info", which is the Host info (the User Info list consists of only host info). The value of the AID12 field 1108"" is set by the host STA. The RUs (RU Allocation) 1110"" listed in the Host Info 1102"" (representing host info field 1008) are the RUs used by the host STA, and the remaining RUs (out of all possible RUs for the indicated bandwidth) are the leftover/shared RUs, which is available for only one guest host.

Various operation performed by a guest STA aiming to transmit on the leftover RUs will now be described. The guest STA, which has received the Trigger Frame transmitted by the Host STA, identifies if the trigger frame is of type "Shared Transmission". If the guest STA identifies that the received Trigger frame is of the type "Shared Transmission", the guest STA identifies the leftover RUs and then uses the trigger frame to sync with the host STA (to align with the upcoming TB frame).

Next the guest STA performs Point Coordination Function (PCF) Inter Frame Space (IFS) (PIFS) (Listen-Before-Talk (LBT) CAT2) back-off before transmission. Other categories of LBT may and sometimes are, also used, as long as the alignment with the following TB frame is ensured. The type of channel sensing (LBT category) may also be, and sometimes is, identified within the "CS required" field in the Common Info.

The guest STA constructs the PHY header of the TB frame as follows. The guest STA constructs the legacy portion of the TB frame using the same attributes found in the legacy portion of the trigger frame, particularly the duration field in the L-SIG and RL-SIG. In some embodiments, the guest STA leaves the HE SIG-A field of the TB frame empty or constructs the HE SIG-A of the TB frame using the attributes in the trigger frame.

The guest STA transmits the HE-STF in the leftover RUs only.

The same number of HE-LTF as indicated in the trigger frame is transmitted and on the leftover RUs only.

Then the MAC payload, with the same Modulation and Coding Scheme (MCS) and MAC Protocol Data Unit (MPDU) size identified in the trigger frame is sent. If no MCS is identified for guest STA, then the same MCS of the host STA is used. This is to allow the AP to decode the guest STAs' payload with similar receiver processes as in 11ax. But, it is possible to allow variations if the AP can process the payload beyond 11ax receiver process, and some embodiments, in which the AP can process the payload beyond 11ax receiver process, allow variations with regard to MCS. For example, a guest STA may use the +/−1 or +/−2 steps with respect to the MCS identified by the host STA in the trigger frame. The AP may attempt decoding the guest STA payload with each of these MCSs, e.g., when processing a received TB frame including information from a host STA and one or more guest STAs.

An AP receiving such an uplink (UL) TB frame (UL TB frame in response to a Trigger Frame (Shared Transmission Type)) e.g., UL Orthogonal Frequency-Division Multiple Access (OFDMA) TB frame, performs the following. The AP processes the portion of the RUs belonging to the guest STAs as usual. The AP processes the portion of the RUs belonging to the guest STA(s) using the attributes (e.g., in the physical header or in the individual STA portions) of the trigger frame sent by the host STA. These attributes include MCS, number of spatial streams, etc. The AP may and in some embodiments, does, provide ACK (for the host STA and guest STA(s) after the UL TB frame, e.g. UL OFDMA TB frame.

There may be, and sometimes are, collisions among multiple guest STAs using the same RUs. To reduce the chance of collision, the AP may and in some embodiments does, restrict using the host STAs' frame to a limited set of STAs, e.g., with low latency traffic, etc. If the AP detects collision among multiple guest STAs, the AP may and in some embodiments, does indicate such in the following ACK frame in order for the guest STA to perform a back-off. In some embodiments, a separate and new backoff category may be identified such. This is in order to allow a guest STA to keep its original backoff for the respective access category.

To enhance coexistence, in some embodiments, a guest STA may attempt to use the host TB frame only if the detected strength (e.g., Received Signal Strength Indicator (RSSI)) of the host frame passes a threshold, e.g., a threshold configured by the AP or indicated in the Trigger frame sent by the host STA. This reduces the chance of additional hidden nodes.

Figure 14:
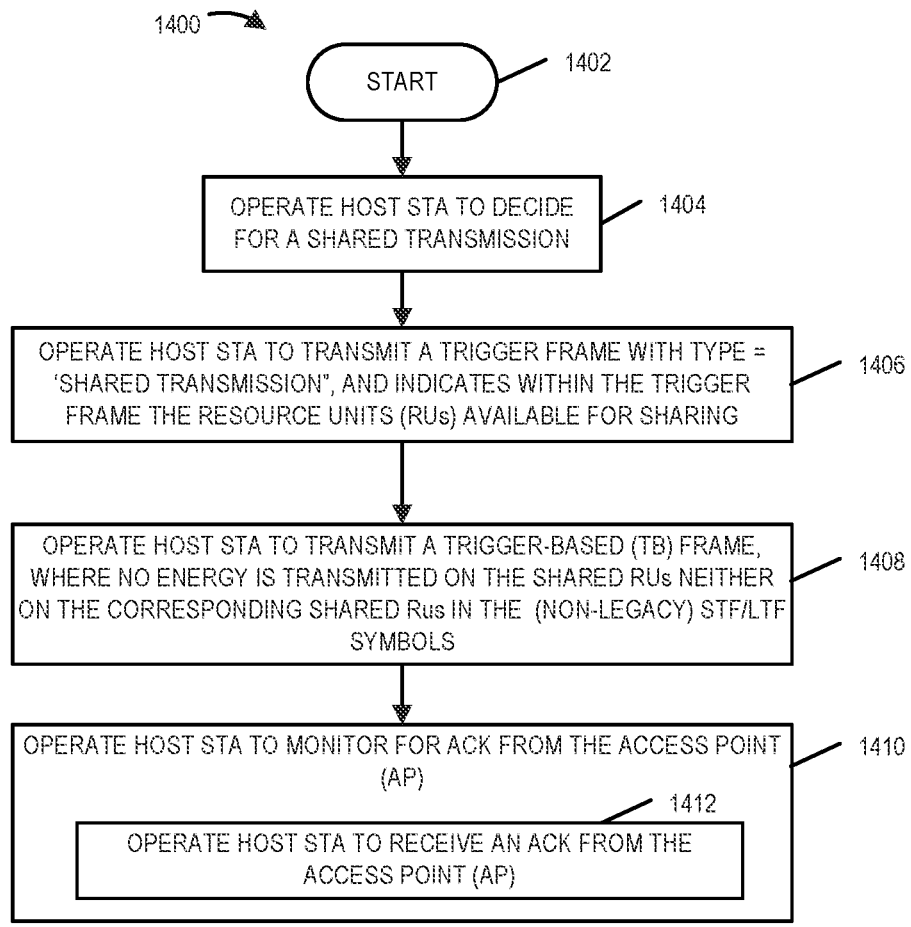
FIG. 14 is a flowchart of an exemplary method of operating a host station (STA) in accordance with an exemplary embodiment.

FIG. 14 is a flowchart 1400 of an exemplary method of operating a host station (STA), e.g., host STA 1 804 of FIG. 8, in accordance with an exemplary embodiment. Operation starts in step 1402 in which the host STA is powered on and initialized. Operation proceeds from step 1402 to step 1404. In step 1404 the host STA decides for a shared transmission. Operation proceeds from step 1404 to step 1406. In step 1406 the host STA transmits a trigger frame with type='shared transmission" and indicates within the trigger frame the resource units (RUs) available for sharing. Operation proceeds from step 1406 to step 1408. In step 1408 the host STA transmits a trigger based (TB) frame, where no energy is transmitted in the shared resource units (RUs) neither on the corresponding shared RUs in the (non-legacy) STF/LTF symbols. Operation proceeds from step 1408 to step 1410.

In step 1410 the host STA monitors for an ACK from the access point (AP). Step 1410 may and sometimes does, include step 1412 in which the host STA receives and ACK for the access point (AP) in response to the transmitted TB frame.

Figure 15:
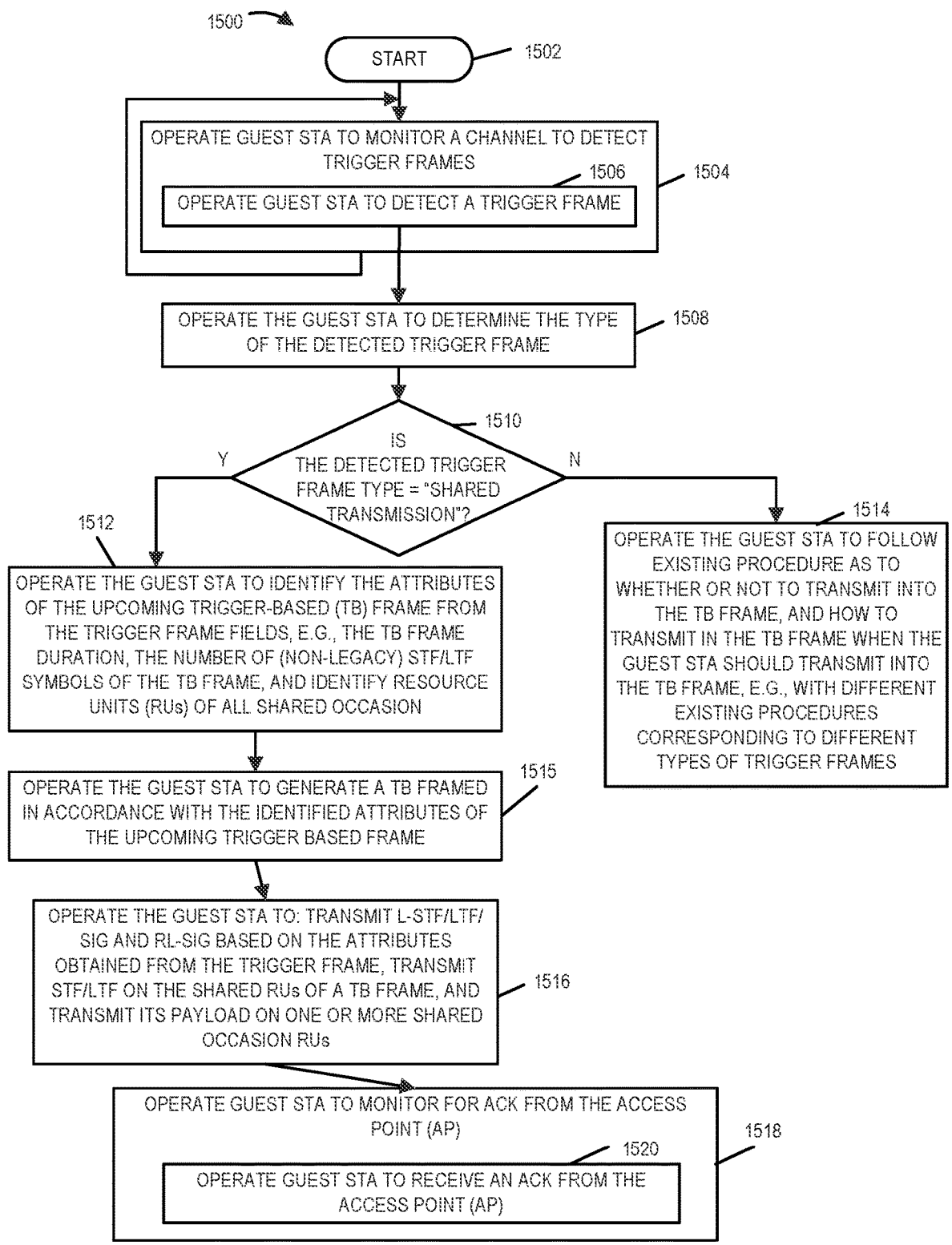
FIG. 15 is a flowchart of an exemplary method of operating a guest station (STA) in accordance with an exemplary embodiment.

FIG. 15 is a flowchart 1500 of an exemplary method of operating a guest station (STA), e.g. guest STA 2 806 of FIG. 8, in accordance with an exemplary embodiment. Operation starts in step 1502 in which the guest STA is powered on and initialized. Operation proceeds from start step 1502 to step 1504. In step 1504 the guest STA monitors a channel to detect trigger frames. Step 1504 may and sometimes does, include step 1506 in which the guest STA detects a trigger frame. Operation proceeds from step 1506 to step 1508. In step 1508 the guest STA determines the type of detected trigger frame, e.g., one of types of trigger frames listed in table 900 of FIG. 9. Operation proceeds from step 1508 to step 1510.

In step 1510 the guest STA determines if the detected trigger frame type="shared transmission". If the detected trigger frame type is shared transmission, then operation proceeds from step 1510 to step 1512. However, if the detected trigger frame type is not shared transmission, then operation proceeds from step 1510 to step 1514, in which the guest STA is operated to follow existing procedures as to whether or not to transmit into the TB frame, and how the guest STA should transmit into the TB frame when the guest STA should transmit into the TB frame, e.g., with different existing procedures corresponding to different types of trigger frames.

Retuning to step 1512, in step 1512 the guest STA identifies the attributes of the upcoming trigger-based (TB) frame from the trigger frame fields, e.g., the TB frame duration, the number of (non-legacy) STF/LTF symbols of the TB frame, and identifies resource units (RUs) of all shared occasion. With the attributes of the upcoming trigger-based frame having been identified, operation proceeds from step 1512 to step 1515 in which the guest station generates a TB frame based on the identified attributes. In some but not necessarily all embodiments step 1515 includes generating at least one legacy symbol, said at least one legacy symbol being a Legacy STF symbol, LTF symbol or SIG symbol and generating at least one non-legacy STF symbol or non-legacy LTF symbol.

Operation proceeds from step 1512 to step 1516.

In step 1516 the guest STA: transmits L-STF/LTF/SIG and RL-SIG based on the attributes obtained from the trigger frame, transmits STF/LTF on the shared RUs of a TB frame, and transmits its payload on one or more shared occasion RUs. Transmitting the generated trigger based frame includes, in some embodiments transmitting the generated non-legacy symbol on the shared resources of the non-legacy STF or LTF portion of the generated trigger based frame (e.g. only transmits on the shared resources of the non-legacy STF/LTF). Operation proceeds from step 1516 to step 1518.

In step 1518 the guest STA monitors for an acknowledgment (ACK) from the access point (AP). Step 1518 may and sometimes does, include step 1520 in which the guest STA receives an ACK from the access point.

Figure 16:
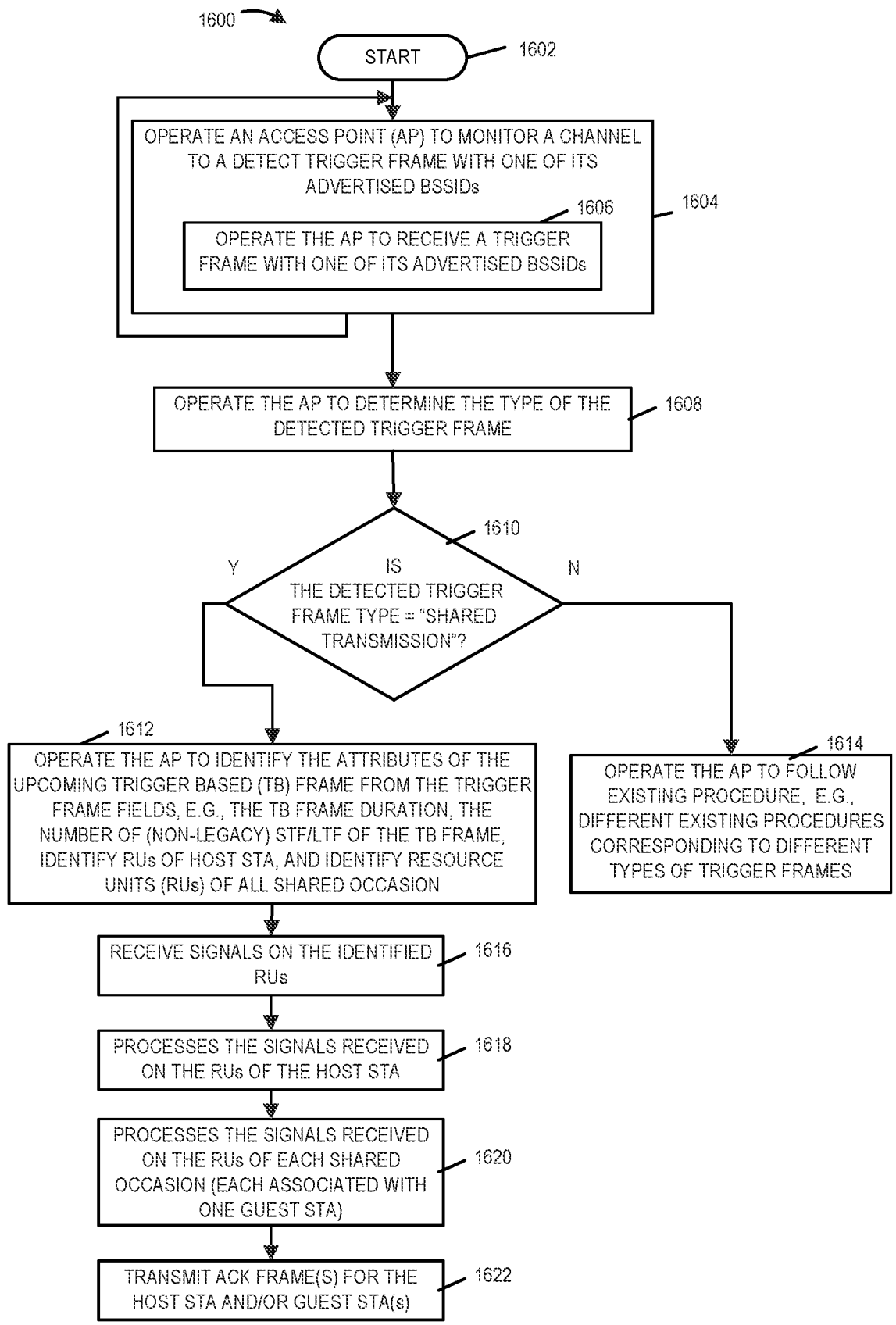
FIG. 16 is a flowchart of an exemplary method of operating an access point (AP) in accordance with an exemplary embodiment.

FIG. 16 is a flowchart 1600 of an exemplary method of operating an access point (AP), e.g., AP 802 of FIG. 8, in accordance with an exemplary embodiment. Operation starts in step 1602 in which the AP is powered on and initialized. Operation proceeds from step 1602 to step 1604.

In step 1604 the AP monitors a channel to detect trigger frame with one of its advertised Basic Service Set Identifiers (BSSIDs). Step 1604 may, and sometimes does, include step 1606 in which the AP receives a trigger frame with one of its advertised BSSIDs. Operation proceeds from step 1604 to step 1606.

In step 1606 the AP determines the type of the detected trigger frame, e.g., one of the various types of trigger frames included in table 900 of FIG. 9. Operation proceeds from step 1608 to step 1610.

In step 1610 the AP determines if the detected trigger frame type="shared transmission". If the detected trigger frame type is shared transmission, then operation proceeds from step 1610 to step 1612. However, if the detected trigger frame type is not shared transmission, then operation proceeds from step 1610 to step 1614, in which the AP is operated to follow existing procedure, e.g., with different existing procedures corresponding to different types of trigger frames.

Retuning to step 1612, in step 1612 the AP identifies the attributes of the upcoming trigger-based (TB) frame from the trigger frame fields, e.g., the TB frame duration, the number of (non-legacy) STF/LTF symbols of the TB frame, identifies RUs of host STA and identifies resource units (RUs) of all shared occasion. Operation proceeds from step 1612 to step 1616.

In step 1616 the AP receives signals on the identified RUS. Operation proceeds from step 1616 to step 1618. In step 1618 the AP processes the signals receives on the RUs of the host STA. Operation proceeds from step 1618 to step 1620. In step 1620 the AP processes the signals received on the RUs of each shared occasion, e.g., each associated with one guest STA. Operation proceeds from step 1620 to step 1622.

In step 1622 the AP transmits ack frame(s) for the host STA ad/or guest STA(s).

Figure 17:
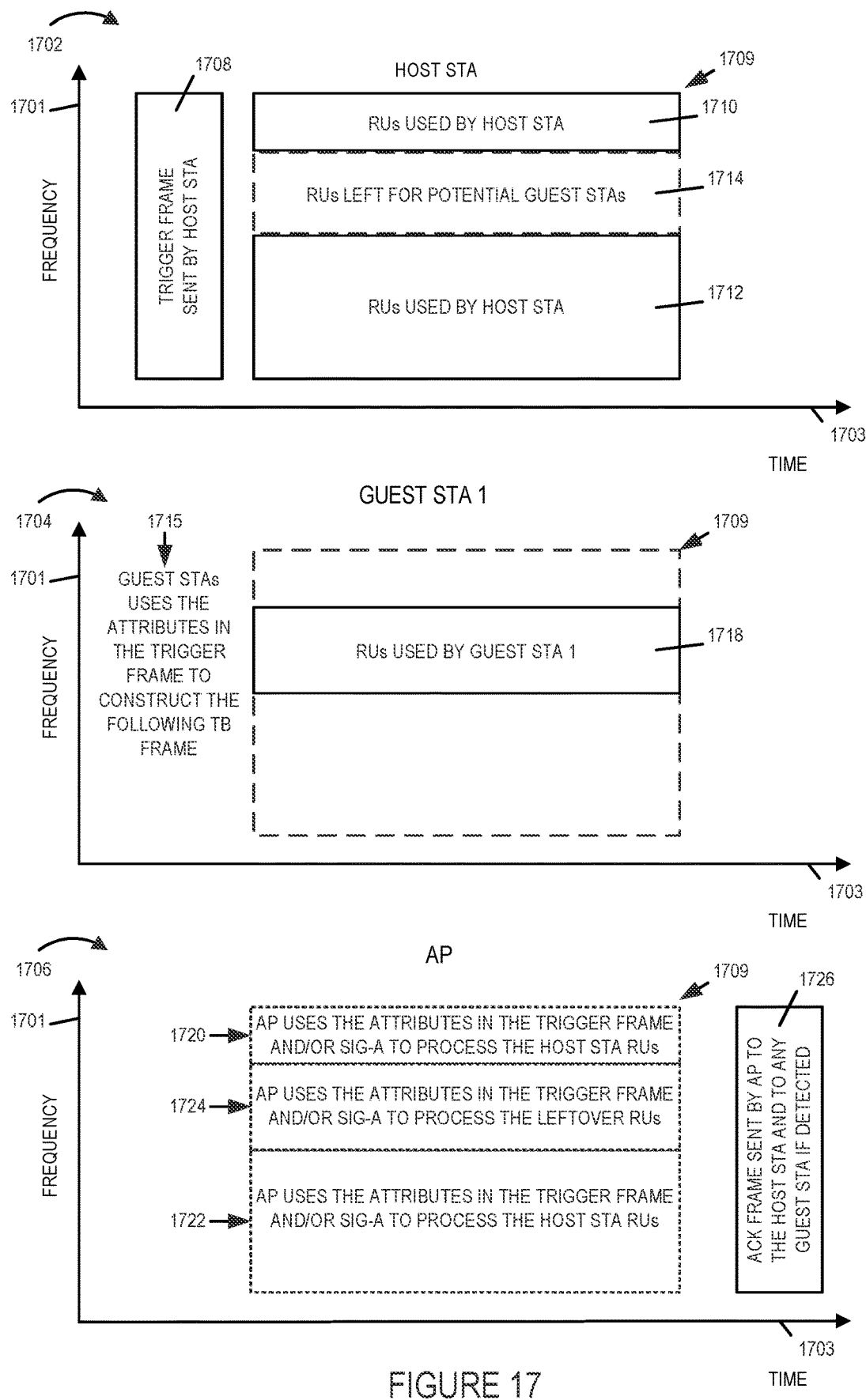
FIG. 17 includes a time frequency plot for each of an exemplary host station, guest station and an access point, for an example of resource sharing in UL transmission in accordance with an exemplary embodiment.

FIG. 17 includes a time frequency plot for each of an exemplary host station, guest station and an access point, for an example of resource sharing in UL transmission in accordance with an exemplary embodiment. Drawing 1702 of FIG. 17 is a time frequency plot for a host STA in accordance with an exemplary embodiment. Drawing 1704 of FIG. 17 is a time frequency plot for a guest STA, e.g., guest STA 1, in accordance with an exemplary embodiment. Drawing 1706 of FIG. 17 is a time frequency plot for an AP in accordance with an exemplary embodiment.

Host STA time frequency plot 1702 includes a vertical axis 1702 representing frequency and a horizontal axis 1703 representing time. Trigger frame 1708 is generated and sent, e.g. transmitted, by the host STA. Block 1709 represents the total resources the TB frame. Resource units 1710 and 1712 of the TB frame 1709 are used by the host STA, which transmits into those resources. RUs 1714 of the TB frame 1709 are left for potential guest STAs.

Guest STA time frequency plot 1704 includes a vertical axis 1702 representing frequency and a horizontal axis 1703 representing time. The guest STA receives and processes the trigger frame 1708. In step 1715 the guest STA(s) use the attributes in the received trigger frame to construct the TB frame (1716). RUs 1718 of the TB frame 1709 are used by the guest station 1 to transmit.

AP time frequency plot 1706 includes a vertical axis 1702 representing frequency and a horizontal axis 1703 representing time. The AP receives the trigger frame transmitted by the host STA and recovers communicated information, and the AP receives the TB frame and recovers the communicated information from the host STA and guest STA 1. In steps 1720 and 1722 the AP uses the attributes in the trigger frame and/or SIG-A to process the Host STA RUs. In steps 1724 the AP uses the attributes in the trigger frame and/or SIG-A to process leftover RUs. The AP generates and sends, e.g., transmits, ACK frame 1726 to the host STA and to any guest STAs if detected.

Figure 18:
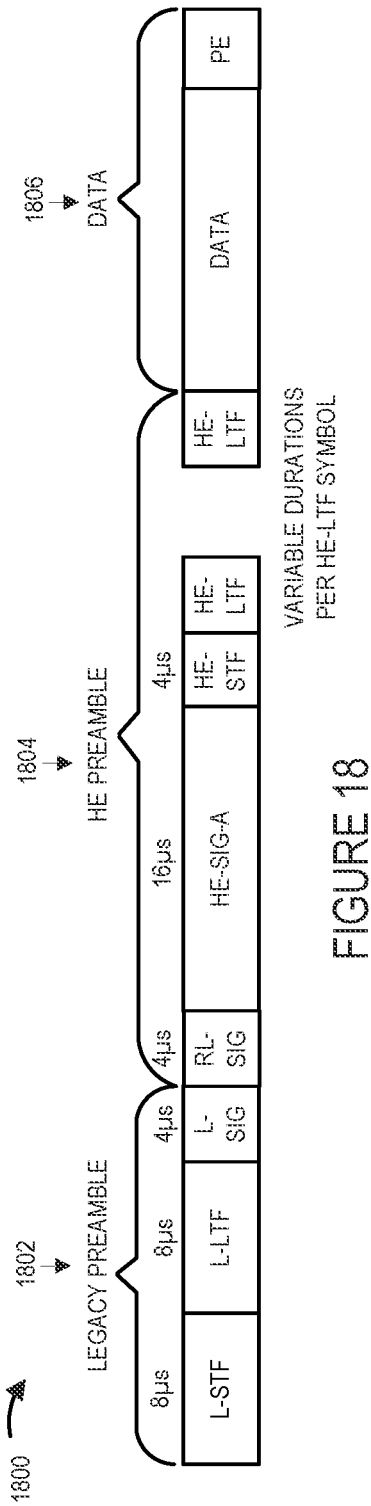
FIG. 18 is a drawing of an exemplary TB frame generated and transmitted by a guest STA in accordance with an exemplary embodiment.

FIG. 18 is a drawing of an exemplary TB frame 1800 generated and transmitted by a guest STA in accordance with an exemplary embodiment. Exemplary TB frame 1800, generated and transmitted by a guest STA, includes a legacy preamble portion 1802, a HE preamble portion 1804 and a data portion 1806. Legacy preamble 1802 includes a 8 micro-sec L-STF, a 8 micro-sec L-LTF, and a 4 micro-sec L-SIG. HE preamble 1804 includes a 4 micro-sec RL-SIG, a 16 micro-sec HE-SIG-A, a 4 micro-sec HE-STF and one or more HE-LTF symbols (variable duration per HE-LTF symbol). Data portion 1806 includes data and PE.

Figure 19:
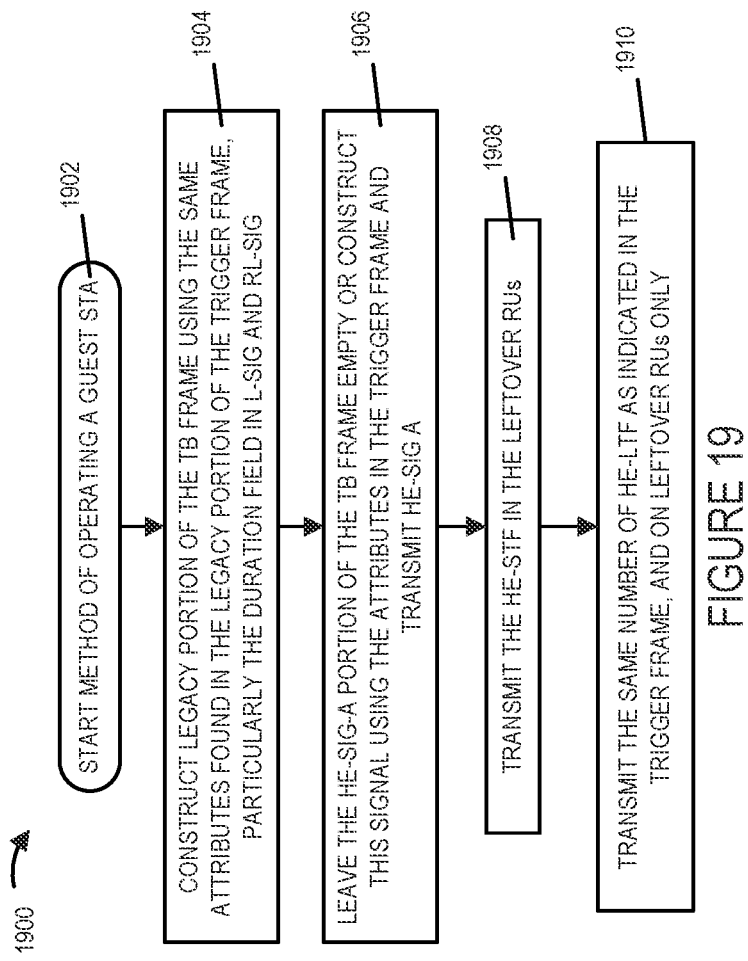
FIG. 19 is a flowchart of an exemplary method of operating a guest STA in accordance with an exemplary embodiment.

FIG. 19 is a flowchart 1900 of an exemplary method of operating a guest STA, e.g., STA 2 806 of FIG. 8, in accordance with an exemplary embodiment. Operation starts in step 1902 in which the guest STA is powered on and initialized. Operation proceeds from 1902 to step 1904. In step 1904 the guest STA construct the legacy portion 1802 of the TB frame 1800 using the same attributes found in the legacy portion of the trigger frame, particularly the duration field in L-SIG and RL-SIG. Operation proceeds from step 1904 to step 1906. In step 1906 the guest STA is controlled to leave the HE-SIG-A portion of the TB frame empty or to construct this signal using the attributes in the trigger frame and transmit the HE-SIG-A. Operation proceeds from step 1906 to step 1908. In step 1908 the guest STA transmits the HE-STF in the leftover RUs. Operation proceeds from step 1908 to step 1910. In step 1910 the guest STA transmits the same number of HE-LTF as indicated in the trigger frame, and on the leftover RUs only.

In another aspect, in some embodiments, the guest STA may and sometimes does, transmit a wideband (e.g., channel BW>20 MHz) frame, where some of the RUs overlap with unused RUs announced by the host STA. This feature assumes that the guest STA performs LBT on the RUs that do not overlap with the trigger frame resources.

Figure 20:
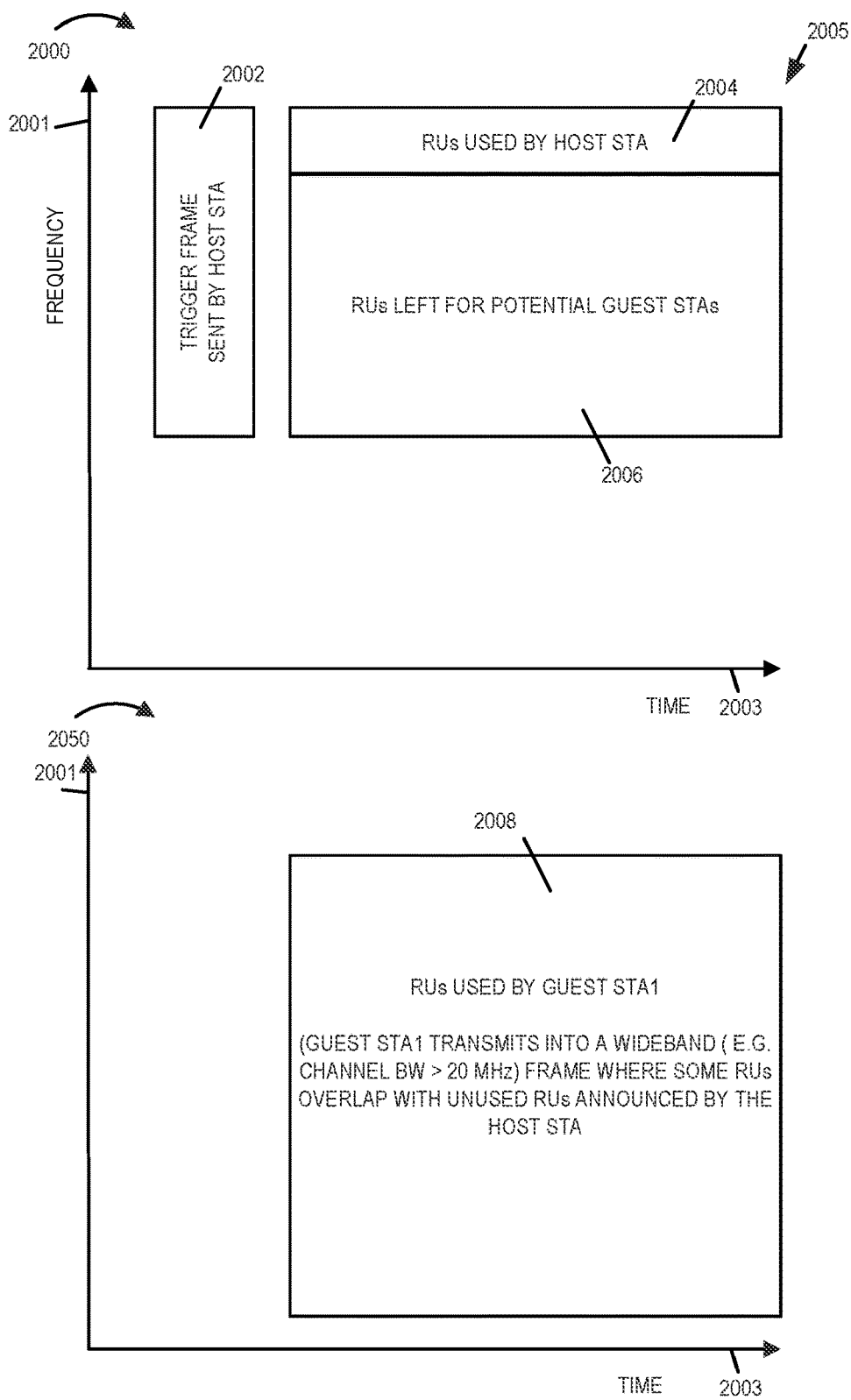
FIG. 20 includes a time frequency plot illustrating an exemplary trigger frame and a corresponding TB frame in accordance with an exemplary embodiment, and a time frequency plot illustrate resource units (RUs) used by exemplary guest STA 1 in accordance with an exemplary embodiment.

FIG. 20 includes a time frequency plot 2000 illustrating an exemplary trigger frame and a corresponding TB frame in accordance with an exemplary embodiment, and a time frequency plot 2050 illustrate resource units (RUs) used by exemplary guest STA 1 in accordance with an exemplary embodiment.

Time frequency plot 2000 includes vertical axis 2001 representing frequency and horizontal axis 2003 representing time. Block 2002 represents a trigger frame (of type Shared Transmission) which his generated and transmitted by a host STA. Block 2005 represents the resources of the corresponding TB frame 2005. The TB frame 2005 includes RUs used by the host STA 2002 and RUs left for potential guest STAs 2004.

Time frequency plot 2050 includes vertical axis 2001 representing frequency and horizontal axis 2003 representing time. Block 2008 identifies RUs used by a guest STA 1 in accordance with an exemplary embodiment. Guest STA 1 transmits into a wideband (e.g., channel>20 MHz) frame where some of the RUs overlap with unused RUs announced by the host STA.

Figure 21:
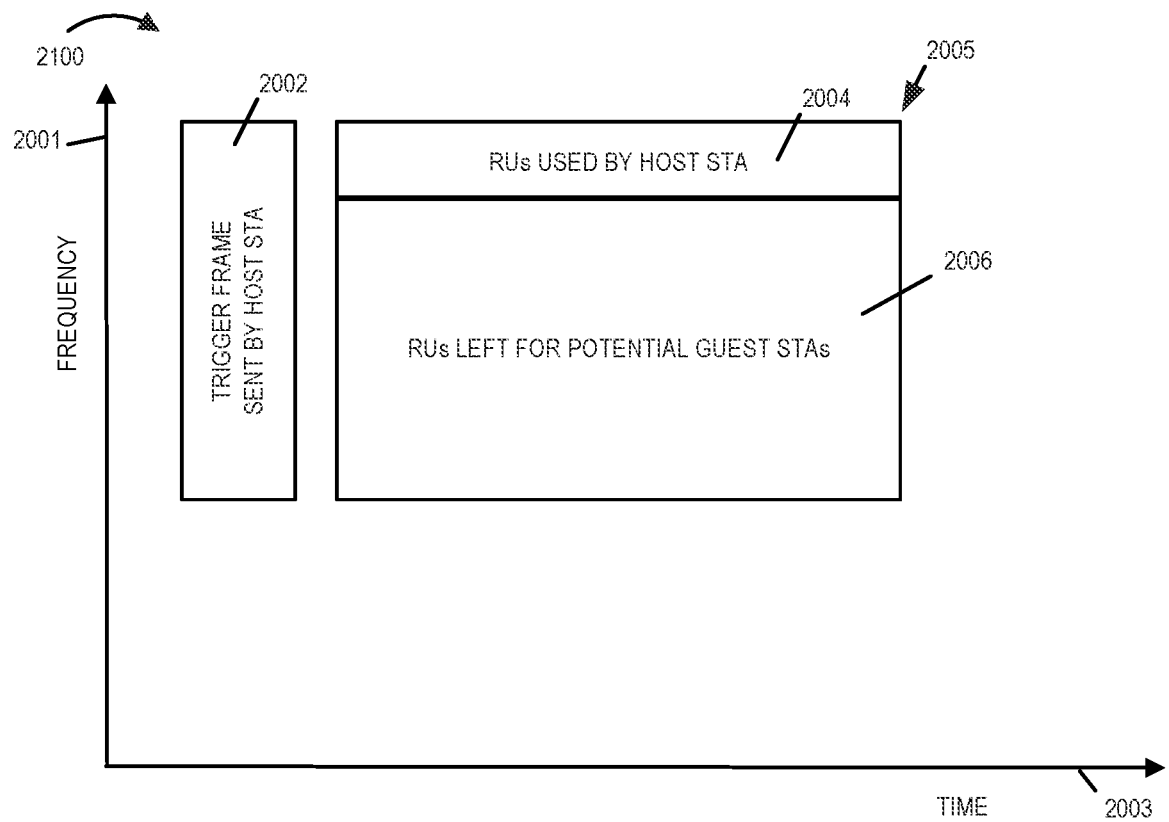
FIG. 21 includes a time frequency plot illustrating an exemplary trigger frame and a corresponding TB frame in accordance with an exemplary embodiment, and a time frequency plot illustrating the trigger frame, resource units of the TB frame used by the host STA and resource units (RUs) used by exemplary guest STA 1 (including some RUs of the TB frame and some RUs outside the TB frame) in accordance with an exemplary embodiment.
Figure 21:
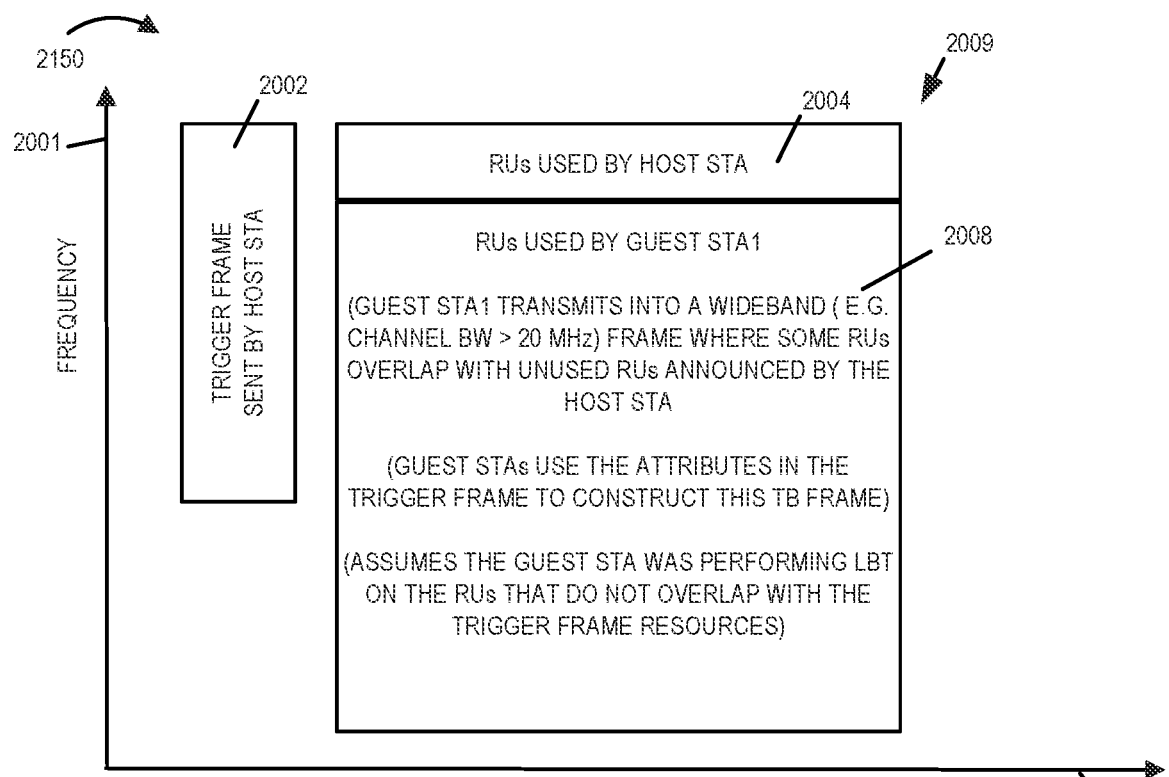

FIG. 21 includes a time frequency plot 2100 illustrating an exemplary trigger frame and a corresponding TB frame in accordance with an exemplary embodiment, and a time frequency plot 2250 illustrating the trigger frame, resource units of the TB frame used by the host STA and resource units (RUs) used by exemplary guest STA 1 (including some RUs of the TB frame and some RUs outside the TB frame) in accordance with an exemplary embodiment.

Drawing 2100 is a copy of drawing 2000 of FIG. 20, which is included for comparison to drawing 2150. Time frequency plot 2150 includes vertical axis 2001 representing frequency and horizontal axis 2003 representing time. Block 2002 represents the trigger frame (of type Shared Transmission) which his generated and transmitted by the host STA. Block 2004 represents the resources of the corresponding TB frame 2005 which are used by the host STA. Block 2008 identifies RUs used by the guest STA 1 in accordance with an exemplary embodiment. Guest STA 1 transmits into a wideband (e.g., channel>20 MHz) frame where some of the RUs overlap with unused RUs announced by the host STA. The guest STA uses the attributes in the trigger frame 2002 to construct the TB frame. The guest STA performs LBT on the RUs of block 2008 that do not overlap with the trigger frame resources. Block 2009 represents the combined resources of RUs 2004 used by the host STA and the RUs 2008 used by guest STA 1.

An exemplary embodiment of medium sharing using MU transmission will now be described. Medium sharing is possible, and implemented in some embodiments, between a host STA and guest STAs using MY PPDU format.

A host STA may and sometimes does, initiated a MU PPDU transmission, where the number of spatial streams used by the host STA is less than the maximum spatial streams of the AP. The remaining spatial stream(s) of the AP may be, and sometimes are used for transmission by other guest STAs.

Figure 1:
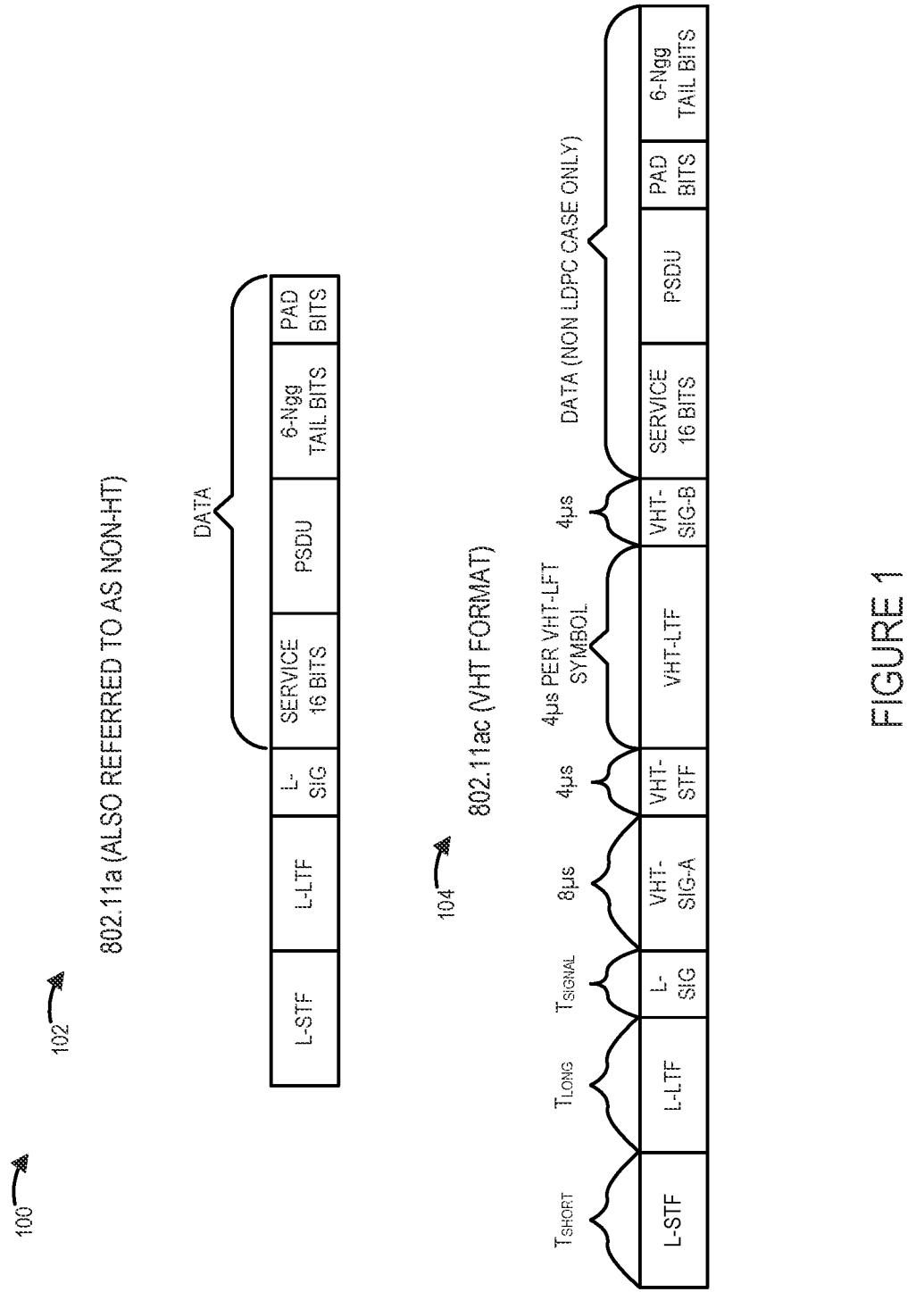
FIG. 1 illustrates 802.11a message format also referred to as non-HT format and 802.11ac message VHT format.
Figure 2:
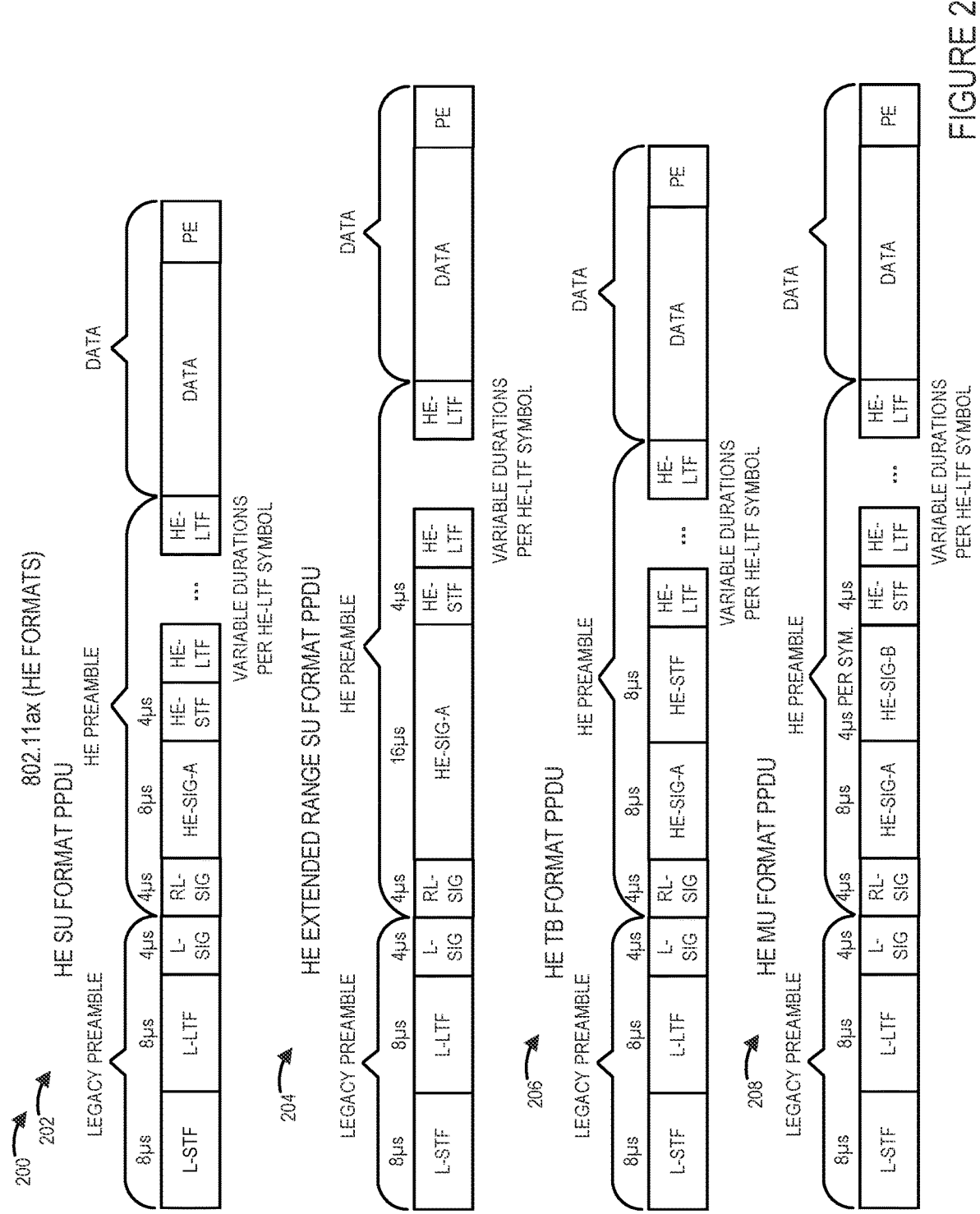
FIG. 2 is a drawing illustrating various 802.11ax (HE FORMATS).
Figure 3:
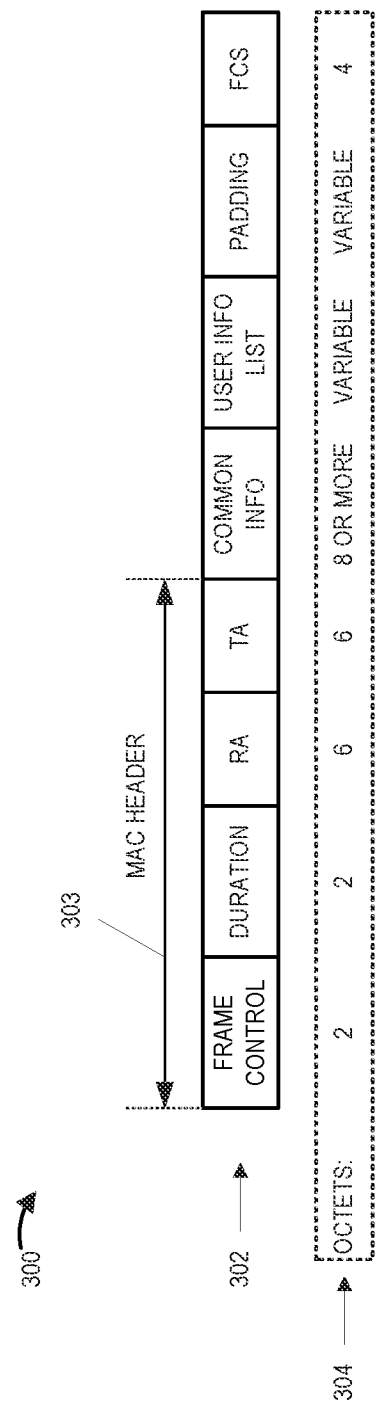
FIG. 3 is a drawing illustrates fields in a Trigger frame format message and the corresponding number of bits for each field.
Figure 4:
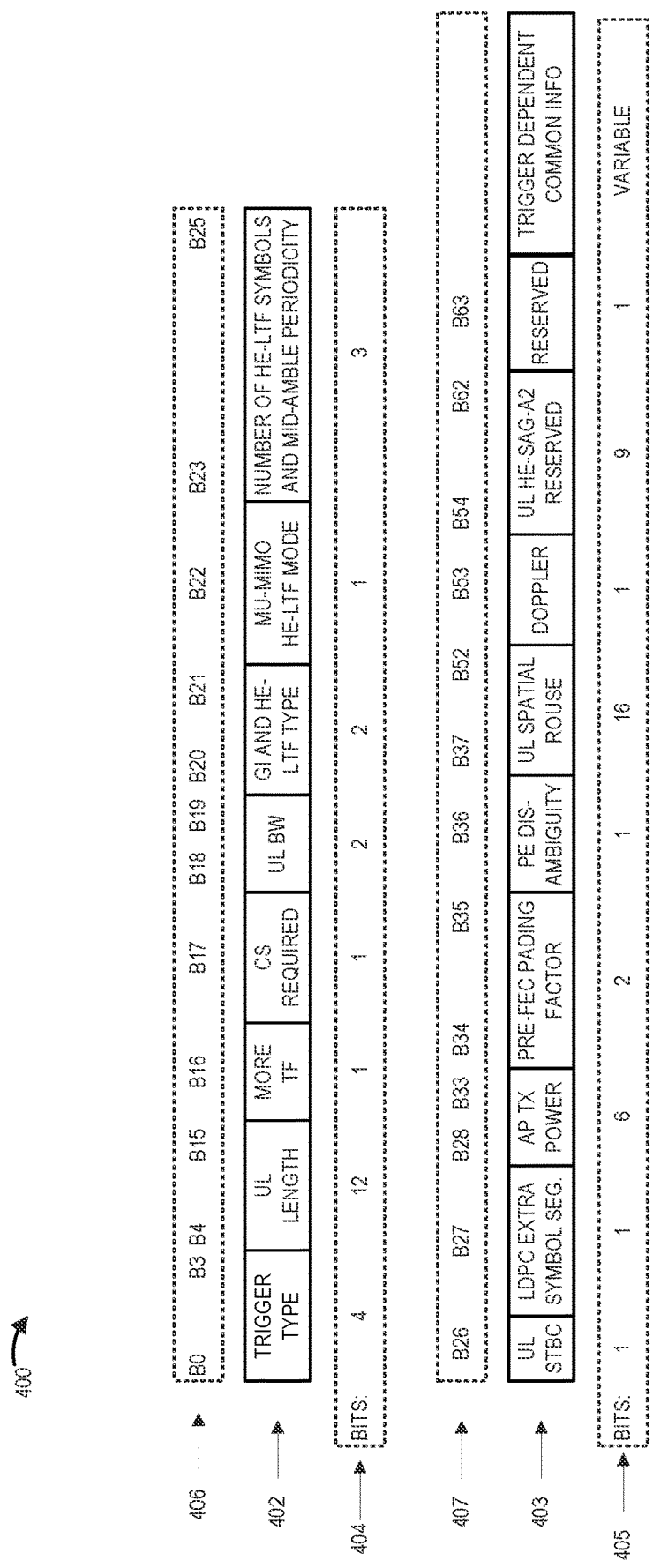
FIG. 4 is a drawing which illustrates fields within Common Field of the Trigger frame format message, the corresponding number of bits for each field within the Common Field, and the corresponding bit designations for the bits of each field within the Common field.
Figure 5:
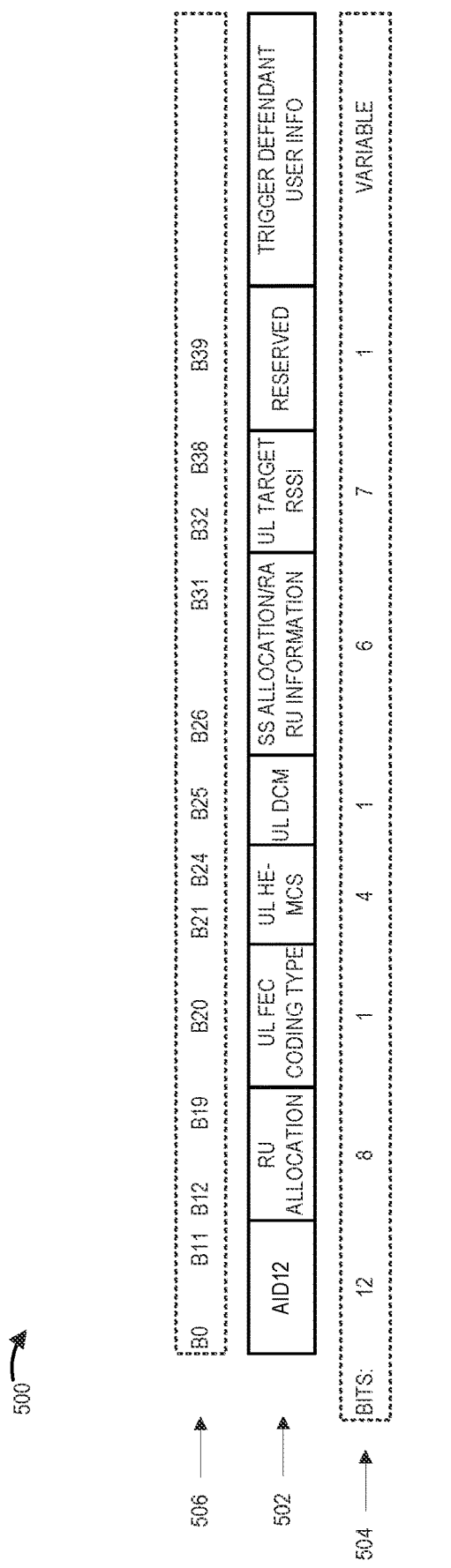
FIG. 5 is a drawing which illustrates fields within User Info Field of the Trigger frame format message, the corresponding number of bits for each field within the User Info Field, and the corresponding bit designations for bits of each field within the User Info field.
Figure 6:
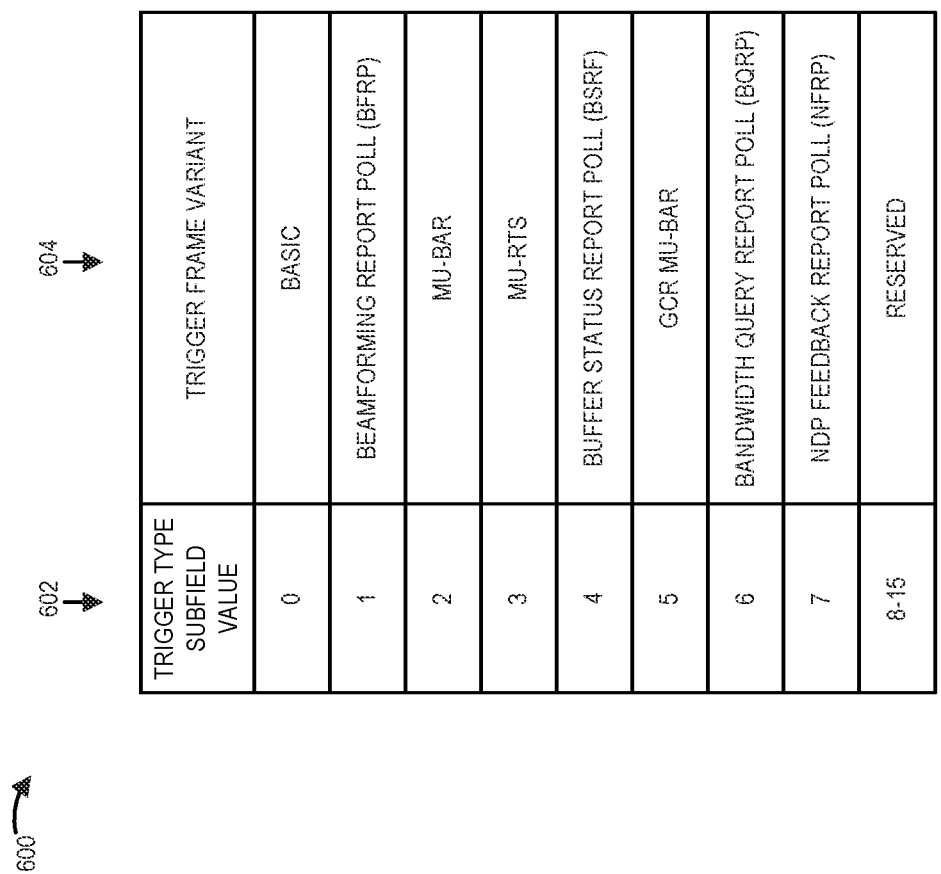
FIG. 6 is a table showing a few identified varieties of trigger frames and the Trigger Type subfield encoding corresponding to each type of trigger frame.
Figure 7:
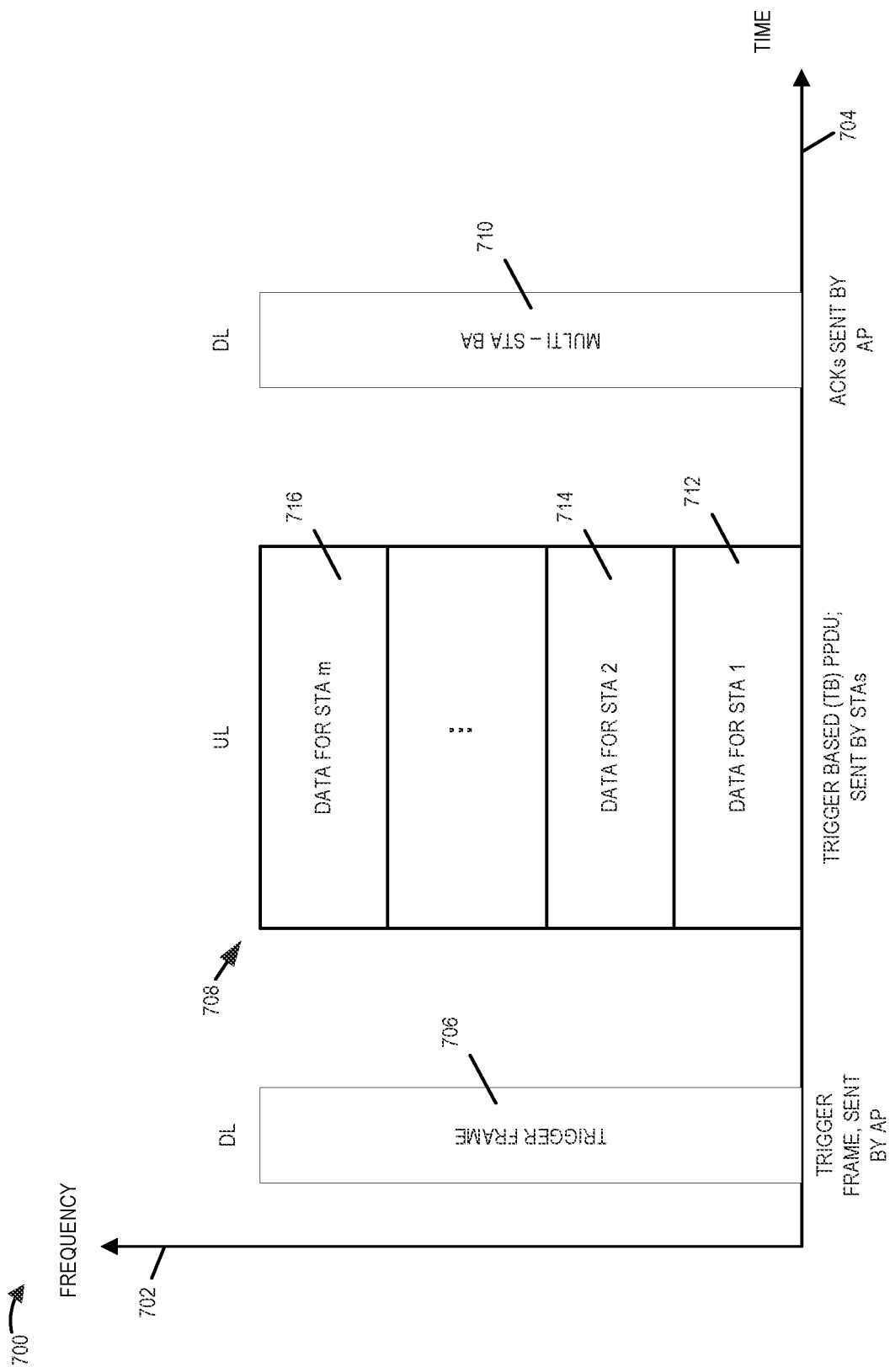
FIG. 7 is a plot of frequency vs time illustrating a trigger frame transmitted in downlink by an access point, trigger-based (TB) frames transmitted by stations (STAs) in the Uplink, and corresponding ACKs transmitted in downlink by the access point.
Figure 22:
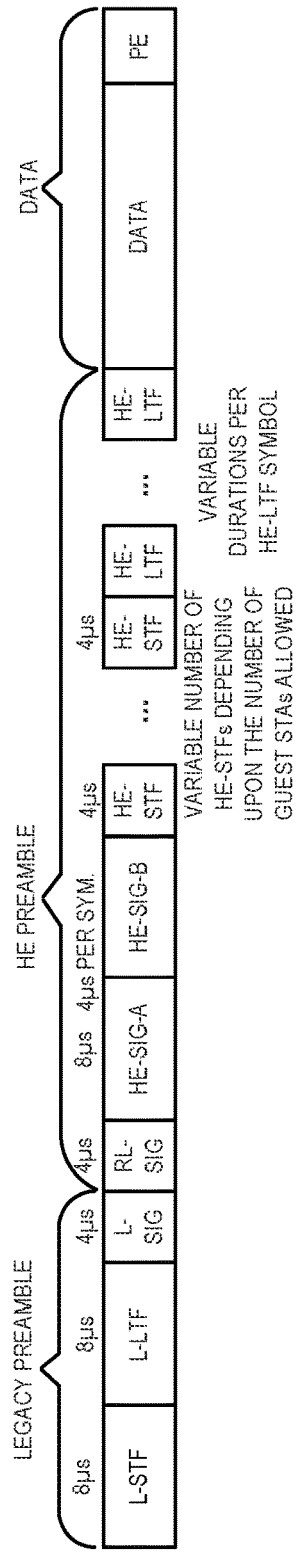
FIG. 22 is drawing illustrating an exemplary first modified HE MU format PPDU in accordance with an exemplary embodiment, which his used in UL medium sharing by a host STA using MU transmission.

In a divergence for the 802.11ax structure of HE MU PPDUs, to enable medium sharing using MU PPDUs, the HE-STF, is repeated once or more (depending upon the number of guest STAs allowed). FIG. 22 shows a novel first modified HE MU format PPDU 2200, e.g., modified from HE MU PPDU 208 of FIG. 2, in accordance with an exemplary embodiment. Exemplary HE MU PPDU 2200 includes a modification to allow sharing medium in UL transmission by a host STA. A variable number of 4 microsec HE-STFs are included in the novel HE MU format PPDU 2200 of FIG. 22, with the number of HE-STFs depending upon the number of Guest STAs allowed, as indicated by information 2202. This is in contrast to the 802.11ax HE MU format PPDU 208 of FIG. 2 which only includes one 4 micro-sec HE-STF.

Figure 23:
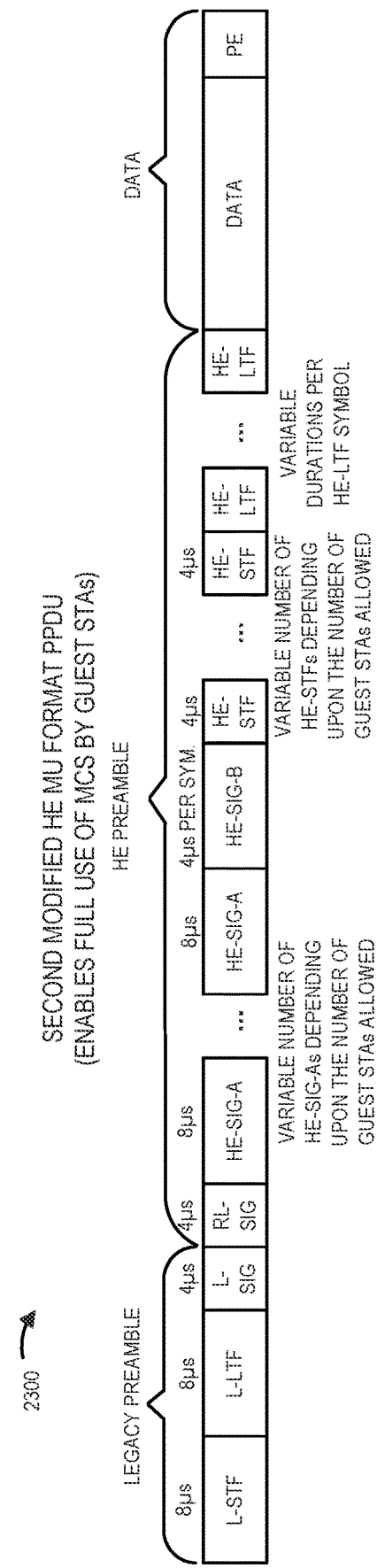
FIG. 23 is drawing illustrating an exemplary first modified HE MU format PPDU in accordance with an exemplary embodiment, which is used, which his used in UL medium sharing by a host STA using MU transmission and enables full use of MCS by guest STAs.

In another modification, included in some embodiments, to enable full use of MCS by guest STAs, HE-SIG-A is repeated as many times as HE-SIG-A, where the first HE-SIG-A is transmitted by the host STA and the remaining HE-SIG-A are transmitted by guest STAs. FIG. 23 is drawing illustrating an exemplary second modified HE MU format PPDU 2300 in accordance with an exemplary embodiment, which is used, which his used in UL medium sharing by a host STA using MU transmission and enables full use of MCS by guest STAs. In second modified HE MU format PPDU 2300, in addition to the modification shown in FIG. 22, there are a variable number of 8 micro-sec HE-SIG-As depending upon the number of guest STAs allowed, as indicated by information 2302. This is in contrast to the 802.11ax HE MU format PPDU 208 of FIG. 2 which only includes one 8 micro-sec HE-SIG-A.

Note that a MU PPDU may be shared by several guest STAs, where a guest STA chooses an order, e.g., j., within the max allowed guest STAs, and transmits on the jth HE-SIG-A and HE-STF and HE-LTF, etc.

An instance of such sharing as follows: i) the host STA may use several spatial streams and indicates so in the trigger frame, however, ii) each guest STA is allowed to use only on spatial stream, hence transmitting only on the jth HE-LTF, If no collision occurs among the guest STAs, such case allows multiple guest STAs to transmit using the same host MU PPDU.

In a divergence from the 802.11ax transmit/receive processing for the HE MU PPDUs: a trigger frame precedes a MU PPDU, where the host STA identifies within the trigger frame: i) the availability of a host MU PPDU, ii) maximum number of guests allowed, hence max number of STF, iii) maximum number of LTF, and indicating the number of LTFs left for guest STAs, etc.

After the trigger frame, within the MU frame: i) the host STA transmits the first STF and transmits no energy on the remaining STFs, ii) the host STA transmits the LTF needed for processing its own frame and transmits no energy on the remaining LTFS, which are left for the potential guest STAs.

After receiving the trigger frame, a guest STA, as in the first exemplary embodiment (previously described), transmits L-STF/L-LTF/L-SIG and RL-SIG based on the attributes found in the trigger frame. The guest STA transmits the MU frame with no energy on the first STF and transmits STF on the relevant STF. The guest STA transmits no energy on LTFs relevant to the host STA and transmits on the allowed leftover LTFs. Similar to the first exemplary embodiment, a guest STA may use the MCS and frame duration identified in the trigger frame by the host STA or a restricted set of MCSs, e.g., the MCS indicated in the trigger frame +/−1 or 2 steps.

An AP receiving a trigger frame followed by such MU frame performs the following: i) processes the trigger frame and separates the STF/LTFs to decode the individual layers with the following MU frame, ii) processes the portion of layers belonging to the host STA as usual, but using only the relevant STF/LTFs, iii) processes the layers belonging to the guest STA using the attributes found in the physical header of the trigger frame send by the host STA, and using only the relevant leftover STF/LTFs.

Figure 24A:
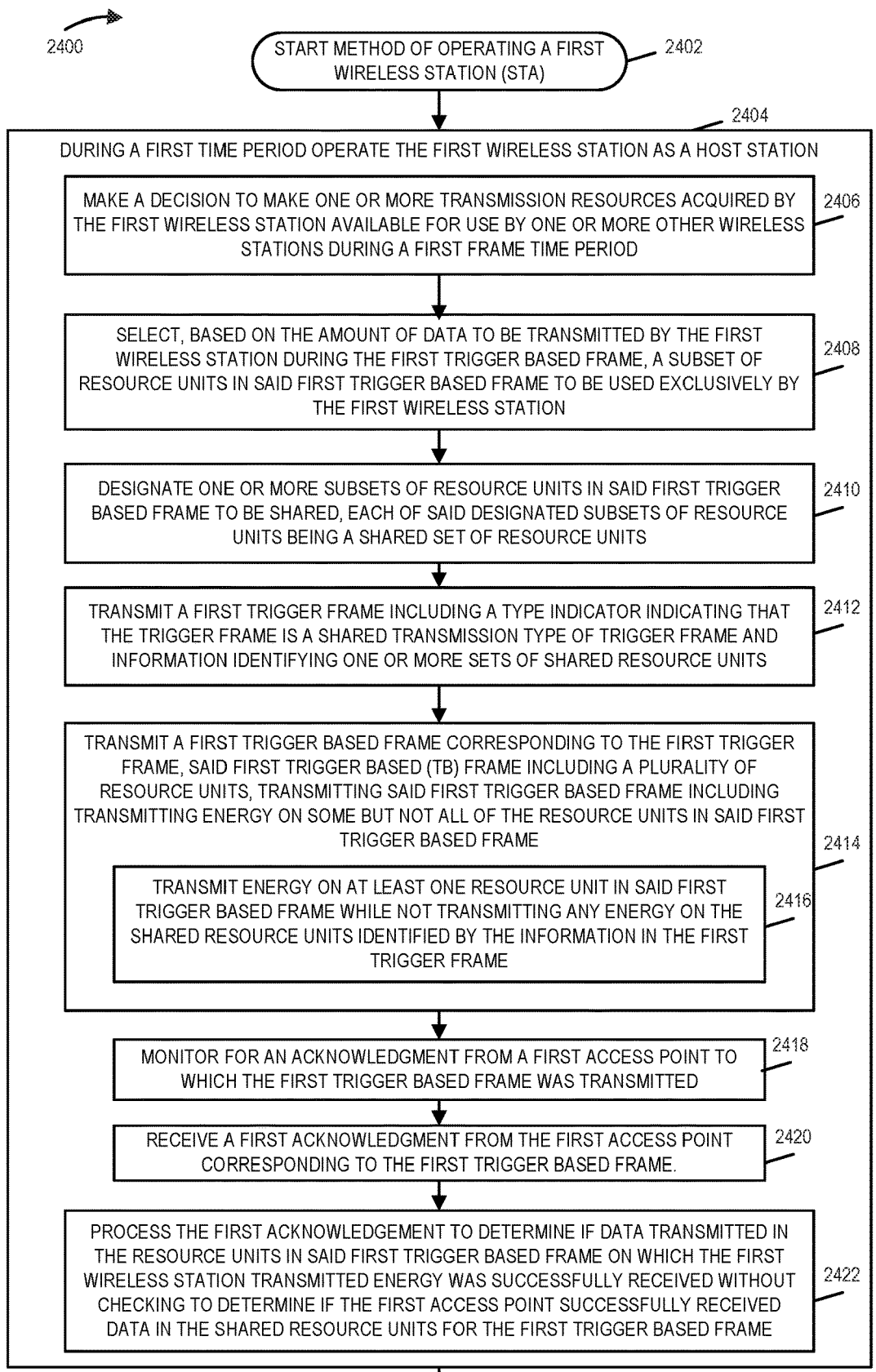
FIG. 24A is a first part of a flowchart of an exemplary method of operating a first wireless station (STA) in accordance with an exemplary embodiment.
Figure 24B:
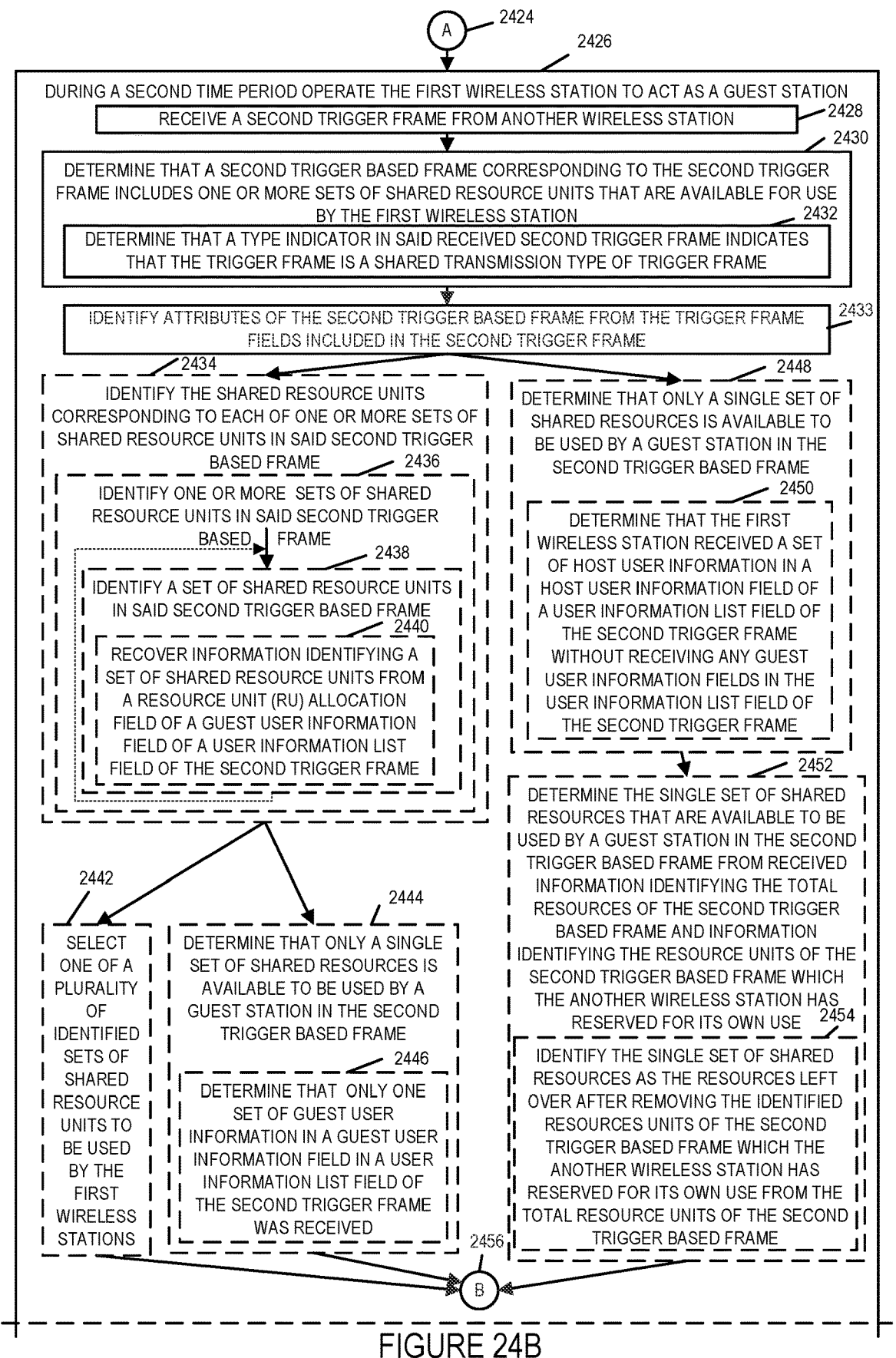
FIG. 24B is a second part of a flowchart of an exemplary method of operating a first wireless station (STA) in accordance with an exemplary embodiment.
Figures 24, 24A, 24B, 24C:
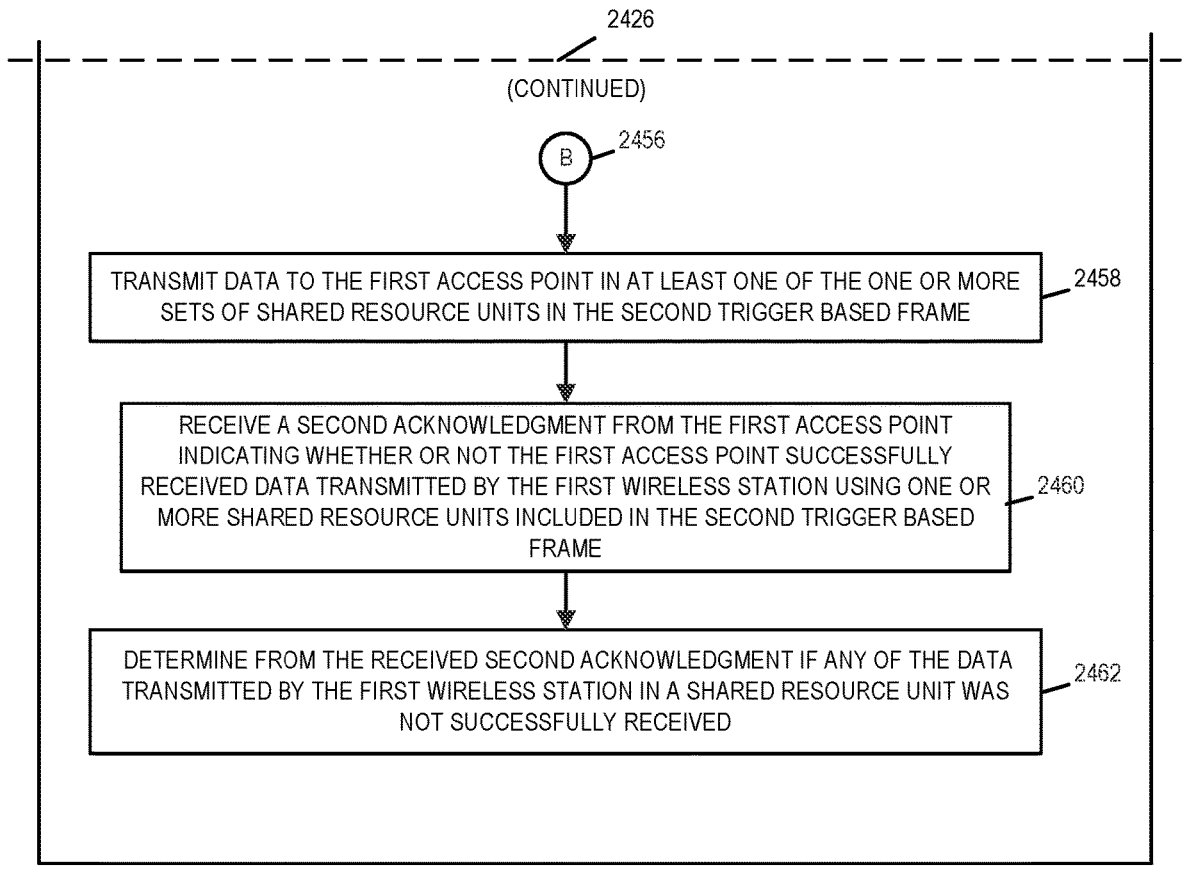
FIG. 24C is a third part of a flowchart of an exemplary method of operating a first wireless station (STA) in accordance with an exemplary embodiment.
FIG. 24 comprises the combination of FIG. 24A, FIG. 24B and FIG. 24C.

FIG. 24, comprising the combination of FIG. 24A, FIG. 24B and FIG. 24C, is a flowchart 2400 of an exemplary method of operating a first wireless station (STA) in accordance with an exemplary embodiment. Operation starts in step 2402 in which the first wireless station is powered on and initialized. Operation proceeds from start step 2402 to step 2404. In step 2404 the first wireless station is operated as a host station during a first time period. Step 2404 includes steps 2406, 2408, 2410, 2412, 2414, 2418, 2430 and 2422.

In step 2406 the first wireless station makes a decision to make one or more transmission units acquired by the first wireless station (e.g., by successfully completing a listen before talk and acquiring the right to transmit or through other means such as by a resource grant to the host station) available for use by one or more of the other wireless stations during a first frame time period. In some embodiments, the first frame time period is a time period corresponding to a first trigger based frame. In some embodiments, said decision to make one or more transmission resources acquired by the first wireless station available for use by one or more other wireless stations a during a first frame time period is a decision to participate in a shared transmission in which the host station will allow one or more wireless stations to operate as guest stations and use at least some of the shared transmission resources in the first trigger based frame while the first wireless stations exclusively uses one or more other resource units of the first trigger based frame to communicate data to a first access point. Operation proceeds from step 2406 to step 2408.

In step 2408, the first wireless station selects, based on the amount of data to be transmitted by the first wireless station during the first trigger based frame, a subset of resource units in said first trigger based frame to be used exclusively by the first wireless station. Operation proceeds from step 2408 to step 2410.

In step 2410 the first wireless station designates one or more subsets of resource units in said first trigger based frame to be shared, each of said designated subsets of resource units being a shared set of resource units. Operation proceeds from step 2410 to step 2412.

In step 2412 the first wireless station transmits a first trigger based frame including a type indicator indicating that the trigger frame is a shared transmission type of trigger frame and information identifying one or more sets of shared resource units, e.g., where shared resource units are resource units that are available for sharing and are thus available for use by other wireless stations.

In some embodiments, said information identifying one or more sets of shared resource units explicitly identifies resource units (e.g., by including one or more resource unit identifiers) of a first trigger based frame, corresponding to the first trigger frame, which are to be used as shared resource units.

In some embodiments, said information identifying one or more sets of shared resource units identifies non-shared resource units of a first trigger based frame, corresponding to the first trigger frame, remaining units in the first trigger based frame beyond the non-shared resource units being shared resource units. Thus in this case, the information implicitly identifies the shared resource units by explicitly identifying the non-shared resource units with the understanding that the omitted resource units are to be shared).

In some embodiments, said information identifying one or more sets of shared resources units includes information which explicitly identifies one or more sets of shared resource units which may be used by guest wireless stations. In some such embodiments, said information explicitly identifying one or more sets of shared resource units which may be used by guest wireless stations includes one of more sets of guest information, each set of guest information including a resource unit (RU) allocation field indicating a set of shared resource units, each set of guest information being communicated in a Guest User Info field of a User Info List field of the first trigger frame. In some such embodiments, said User Info List field of the first trigger frame includes a Host User Info field and one or more Guest User Info fields.

In some embodiments, said information which can be used to identify one or more sets of shared resources units includes information identifying the total resources of the trigger based frame and information identifying the resource units of the trigger based frame which the first wireless station (acting as a host station) has reserved for its own use. For example, there is a single set of shared resource units in the first trigger based (TB) frame which may be used by a guest STA, where the single set of shared resource units is implicitly communicated by the host STA, which sends information in the first trigger frame identifying the total resource units of the first TB frame (e.g., in a common information field of the first trigger frame) and resource units of the first TB frame allocated by the host STA to the host STA (e.g., communicated in a host user info field of an user info list field of the first trigger frame), with guest STAs and the access point (AP) determining the single set of available guest STA resource units, e.g., by calculating: single set of guest STA resource units=total resource units for TB frame−resource units allocated by the host STA to the host STA.) In some such embodiments, the information identifying the resource units of the trigger based frame which the first wireless station has reserved for its own use is communicated in a RU allocation field of a Host User Info field of a User Info List field of the first trigger frame. In some such embodiments, the User Info List field of the first trigger frame includes a Host User Info field but does not include any guest User Info fields. In some such embodiments, resource units of the trigger based frame corresponding to the first trigger frame which are not identified in the User Info List field of the first trigger frame are available for use as shared resource units.

Operation proceeds from step 2412 to step 2414. In step 2414 the first wireless station transmits a first trigger based (TB) frame including a plurality of resource units, transmitting said first trigger based frame including transmitting energy on some but not all of the resource units in said first trigger based frame. Step 2414 includes step 2416. In step 2416 the first wireless station transmits energy on at least one resource unit in said first trigger based frame while not transmitting any energy on the shared resource units identified by the information in the first trigger frame. Operation proceeds from step 2414 to step 2418.

In step 2418 the first wireless station monitors for an acknowledgement form a first access point to which the first trigger based frame was transmitted. Operation proceeds from step 2418 to step 2420.

In step 2420 the first wireless station receives a first acknowledgment form the first access point corresponding to the first trigger based frame. In some embodiments, the first acknowledgment includes an indication whether data was successfully received from the host station on one or more resource units on which the host station transmitted energy. Operation proceeds from step 2420 to step 2422.

In step 2422 the first wireless station processes the first acknowledgment to determine if data transmitted in the resource units in said first trigger based frame on which the first wireless station transmitted energy was successfully received without checking to determine if the first access point successfully received data in the shared resource units for the first trigger based frame. Operation proceeds from step 2404, via connecting node A 2424, to step 2426.

In step 2426 the first wireless station is operated to act as a guest station during a second time period. Step 2426 includes steps 2428, 2430, 2433, 2434, 2442, 2444, 2448, 2452, 2458, 2460 and 2462.

In step 2428 the first wireless station receives a second trigger frame from another wireless station. Operation proceeds from step 2428 to step 2430. In step 2430 the first wireless station determines that a second trigger based frame corresponding to the second trigger frame includes one or more sets of shared resource units that are available for use by the first wireless station. Step 2430 includes step 2432, in which the first wireless station determines that a type indicator in said received second trigger frame indicates that the trigger frame is a shared transmission type of trigger frame. Operation proceeds from step 2430 to step 2433.

In step 2433 the first wireless station identifies attributes of the second trigger based frame from the trigger frame fields included in the second trigger frame. Operation proceeds from step 2433 to one of step 2432 and step 2448, e.g., depending upon the particular implemented embodiment and/or depending upon whether or not a only a single set of shared resources is available to be used by a guest station. In some embodiments, information about each set of shared resources, which are being made available to a guest STA is communicated explicitly in the second trigger frame and operation proceeds from step 2433 to step 2434. In some embodiments, when there is only one set of shared resource being made available to a guest STA, the information about the single set of shared resources being made available to a guest STA is communicated implicitly and operation proceeds from step 2433 to step 2448; however, if there is more than one set of shared resource beings made available to guest STAs, then the information about each set of shared resources, which are being made available to a guest STA, is communicated explicitly in the second trigger frame and operation proceeds from step 2433 to step 2434.

In step 2434 the first wireless station identifies the shared resource units corresponding to each of one or more sets of shared resource units in said second trigger based frame. In some embodiments, said second trigger frame includes a User Info List field including a Host User Info field and one or more Guest User Info fields. Step 2434 includes step 2436 in which the first wireless station identifies one or more sets of shared resource units in said second trigger based frame. Step 2436 includes step 2438 in which the first wireless station identifies a set of shared resource units in said second trigger based frame. Step 2438 includes step 2440 in which the first wireless station recovers information identifying a set of shared resource units from information included in the second trigger frame including information from a resource unit (RU) allocation field of a guest user information field of a user information list field of the second trigger frame Step 2438 is performed one or more times, e.g. one iteration of step 2438 for each set of shared resource units to be made available to guest stations. Operation proceeds from step 2434 to step 2442 or step 2444, e.g., depending upon the number of sets of shared resources units to be made available to guest stations. In some embodiments, said second trigger based frame includes two or more sets of shared resource units. If there are two or more sets of sets of shared resources units to be made available to guest wireless stations, then operation proceeds from step 2434 to step 2442, in which the first wireless station selects one of a plurality of identified sets of shared resources units as the shared resource units to be used by the first wireless station. In some embodiments, the first wireless station is allowed to, and sometimes does, select multiple sets of shared resources units in said plurality of identified sets of shared resources units as the shared resource units to be used by the first wireless station.

Returning to step 2444, in step 2444 the first wireless station determines that only a single set of shared resource is available to be used by a guest station in the second trigger based frame. Step 2444 includes step 2446 in which the first wireless station determines that only one set of guest user information in a guest user information field in a user information list field of the second trigger frame was received.

Returning to step 2448, in step 2448 the first wireless station determines that only a single set of shared resources is available to be used by a guest station in the second trigger based frame. Step 2448 includes step 2450, in which the first wireless station determines that the first wireless station received a set of host user information in a host user information field of a user information list field of the second trigger frame without receiving any guest user information fields in the user information list field of the second trigger frame. Operation proceeds from step 2450 to step 2452.

In step 2452 the first wireless station determines the single set of shared resources that are available to be used by a guest station in the second trigger based frame from received information identifying the total resources of the second trigger based frame and information identifying the resource units of the second trigger based frame which the another wireless station has reserved for its own use. Step 2452 includes step 2454 in which the first wireless station identifies the single set of shared resources as the resources left over after removing the identified resource units of the second trigger based frame which the another wireless station (host station) has reserved for its own use from the total resource units of the second trigger based frame.

Operation proceeds from step 2442, step 2444 or step 2452, via connecting node B 2456 to step 2458. In step 2458 the first wireless station transmits data to the first access point in at least one of the one or more sets of shared resource units in the second trigger based frame. Operation proceeds from step 2458 to step 2460. In step 2460 the first wireless station receives a second acknowledgment from the first access point indicating whether or not the first access point successfully received data transmitted by the first wireless station using one or more shared resource units included in the second trigger based frame. Operation proceeds from step 2460 to step 2462. In step 2462 the first wireless station determines from the received second acknowledgment if any of the data transmitted by the first wireless station in a shared resource unit was not successfully received.

Figure 25:
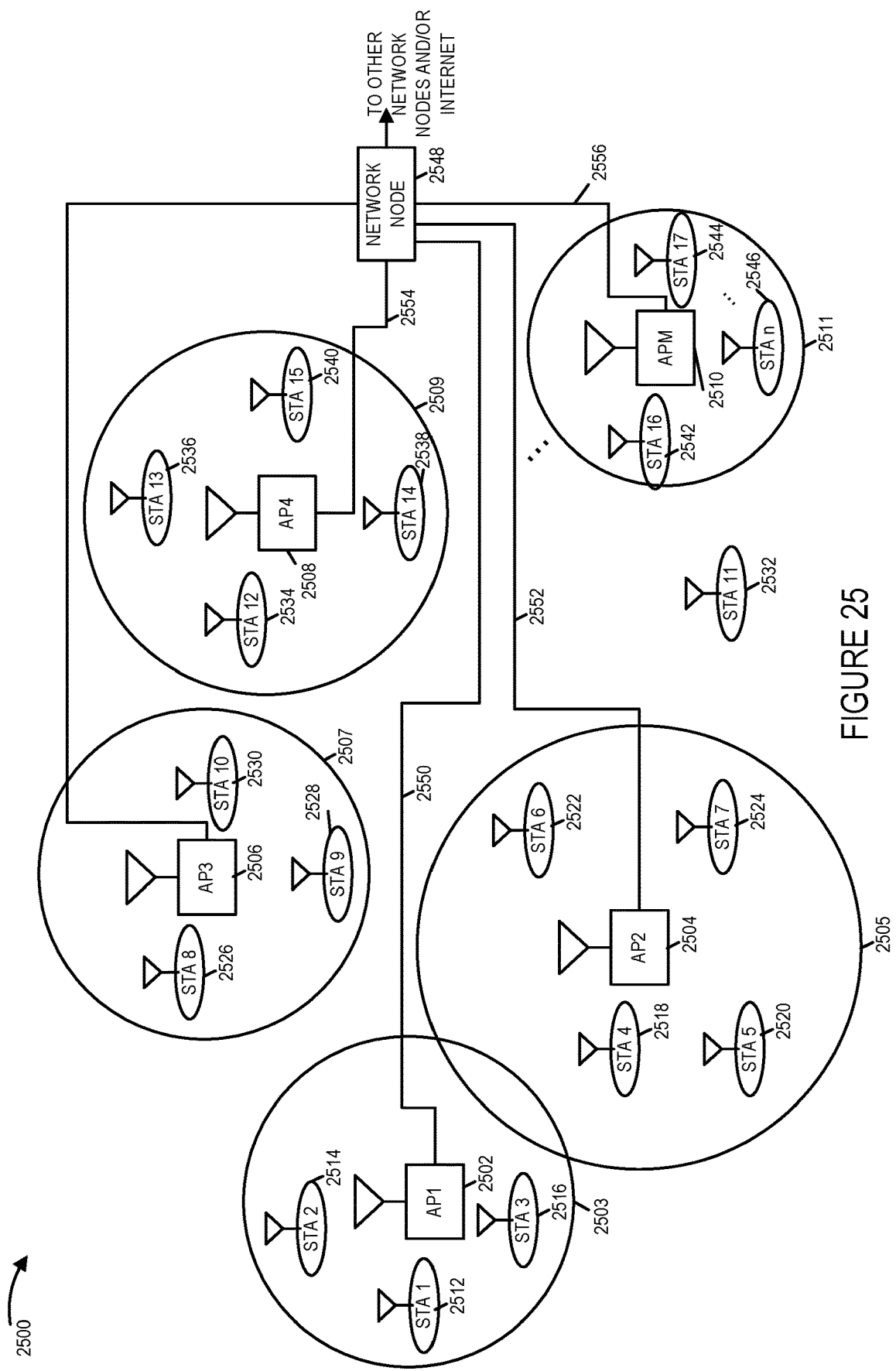
FIG. 25 is a drawing of an exemplary wireless communications system in accordance with an exemplary embodiment.

FIG. 25 is a drawing of an exemplary wireless communications system 2500 in accordance with an exemplary embodiment. Exemplary communications system 2500 includes a plurality of access point (AP 1 2502, AP 2 2504, AP 3 2506, AP 4 2508, . . . , APM 2510), each with a corresponding wireless coverage area (2503, 2505, 2507, 2509, . . . , 25111), respectively, a network node 2448, and a plurality of wireless stations (STAs) (STA 1 2512, STA 2 2514, STA 3 2516, STA 4 2518, STA 5 2520, STA 6 2522, STA 7 2524, STA 8 2526, STA 9 2528, STA 10 2530, STA 11, 2532, STA 12 2534, STA 13 2536, STA 14 2538, STA 15 2540, STA 16 2542, STA 17 2544, . . . , STA n 2546). The access points (2502, 2504, 2506, 2508, 2510) are coupled to the network node 2548 via communications links (2550, 2552, 2554, 2556), respectively. The network node 2548 is coupled to other network nodes and/or the Internet. The wireless coverage area of one access point in system 2500 may be non-overlapping, partially overlapping or fully overlapping with the wireless coverage area of another access point in the system 2500. The wireless stations may be, and some are, mobile devices which may move throughout the system 2500. In FIG. 25, stations (STA 1 2512, STA 2 2514 and STA 3 2516) are shown to be within the wireless coverage area 2503 of access point 1 2502. In FIG. 25, stations (STA 4 2518, STA 5 2520, STA 6 2522 and STA 7 2524) are shown to be within the wireless coverage area 2505 of access point 2 2504. In FIG. 25, stations (STA 8 2526, STA 9 2528 and STA 10 2530) are shown to be within the wireless coverage area 2507 of access point 3 2506. In FIG. 25, stations (STA 12 2534, STA 13 2536, STA 14 2538 and STA 15 2540) are shown to be within the wireless coverage area 2509 of access point 4 2508. In FIG. 25, stations (STA 16 2542, STA 17 2544 and STA n 2546) are shown to be within the wireless coverage area 2511 of access point M 2510. A wireless station, e.g., any of stations (STA 1 2512, STA 2 2514, STA 3 2516, STA 4 2518, STA 5 2520, STA 6 2522, STA 7 2524, STA 8 2526, STA 9 2528, STA 10 2530, STA 11, 2532, STA 12 2534, STA 13 2536, STA 14 2538, STA 15 2540, STA 16 2542, STA 17 2544, . . . , STA n 2546), may act as a host station, e.g., transmitting shared resource type trigger frames and transmitting data using host resource units of a corresponding TB frame, during some time intervals and act as a guest station, e.g., receiving a shared resource type trigger frame and transmitting data using shared guest resource units of a corresponding TB frame during other time intervals.

Figure 26:
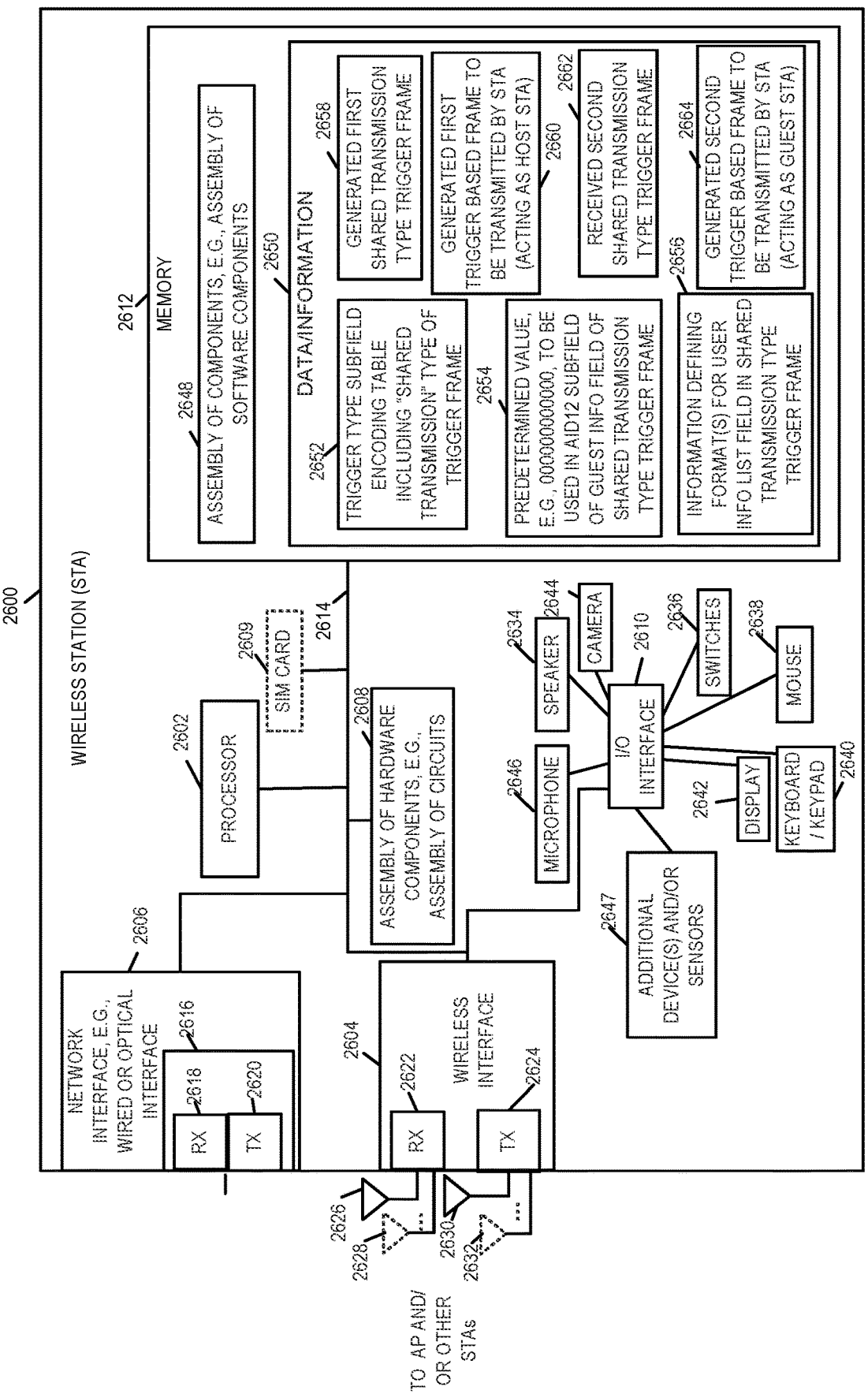
FIG. 26 is a drawing of an exemplary wireless station (STA) in accordance with an exemplary embodiment.

FIG. 26 is a drawing of an exemplary wireless station (STA) 2600 in accordance with an exemplary embodiment. Exemplary wireless station 2600 is, e.g., the first wireless station implementing the method of flowchart 2400 of FIG. 24, any of the wireless stations of system 2500 of FIG. 25, and/or any of the wireless stations described with respect to any FIGS. 8-25 and FIG. 27. Exemplary wireless STA 2600 includes a processor 2602, e.g., a CPU, a wireless interface 2604, a network interface 2606, an assembly of hardware components 2608, e.g., an assembly of circuits, am optional Subscribed Identity Module (SIM) card 2609, an I/O interface 2610 and a memory 2612 coupled together via a bus 2614 over which the various elements may interchange data and information. Exemplary wireless STA 2600 further includes a plurality I/O devices (speaker 2634, camera 2644, switches 2636, mouse 2638, display 2642, e.g., a touch screen display, keyboard/keypad 2640, microphone 2646 and additional devices(s) and/or sensor(s) 2647 coupled to the I/O interface 2610. Network interface 2606, e.g., a wired or optical interface, includes a receiver 2618 and a transmitter 2620. In some embodiments the receiver 2618 and transmitter 2620 are include as part of a transceiver 2616, e.g., a transceiver chip.

Wireless interface 2604 includes a wireless receiver 2622 coupled to one or more receive antennas (2626, . . . , 2628) via which the wireless station 2600 receives wireless signals including, e.g., a grant of uplink resources from an access point, a shared resources type trigger frame from another STA, and an acknowledgment from an access point. Wireless interface 2604 includes a wireless transmitter 2624 coupled to one or more transmit antennas (2630, . . . , 2632) via which the wireless station 2600 transmits wireless signals including, e.g., a shared resources type trigger frame, a trigger based frame including data on resource units self-allocated to the wireless station while acting as a host STA, and a trigger based frame including data on shared resource units allowed to be used by guest STAs while acting as a guest STA. In some embodiments, the wireless interface 2604 includes multiple receivers and multiple transmitters. In some embodiments, one or more of the same antennas are used for both transmit and receive. In some embodiments, the wireless station supports MIMO operations.

Figure 27:
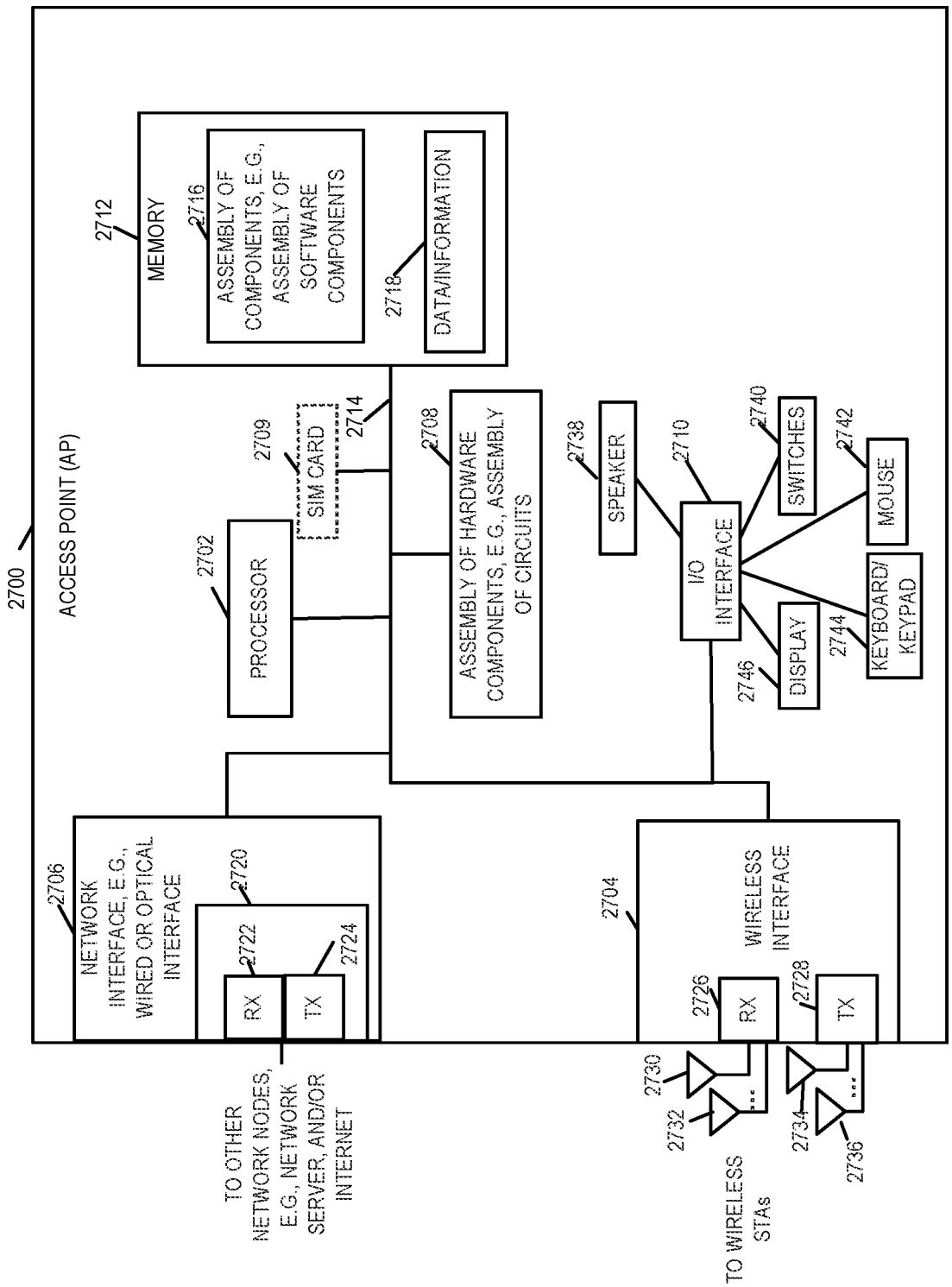
FIG. 27 is a drawing of an exemplary access point (AP) in accordance with an exemplary embodiment.

Memory 2612 includes an assembly of components 2648, e.g., an assembly of software components, e.g., an assembly of software routines and/or software modules, and data/ information 2650. Data information 2650 includes a trigger type subfield encoding table including a "shared transmission" type trigger frame, e.g., trigger type subfield encoding table 900 of FIG. 9, a stored predetermined value, e.g., the 12 bit value=000000000000, to be used in an AID12 subfield of a guest information field of a shared transmission type trigger frame 2654, information defining the format(s) for user information field(s) in a user information list field of a shared transmission type trigger frame, a generated first shared transmission type trigger frame 2658, which was generated by the wireless station while acting as a host STA, a generated first TB frame 2660 (corresponding to the first shared transmission trigger frame) to be transmitted by the wireless station while acting as a host STA, a received second shared transmission type trigger frame 2662, which was received by the wireless station while acting as a guest STA, a generated second TB frame 2664 (corresponding to the second shared transmission type trigger frame) to be transmitted by the wireless station while acting as a guest STA, FIG. 27 is a drawing of an exemplary access point (AP) 2700 in accordance with an exemplary embodiment. Exemplary access point 2700 is, e.g., the access point described with respect to flowchart 2400 of FIG. 24, any of the access points (2502, 2504, 2506, 2508, . . . , 2510) of system 2500 of FIG. 25, and/or an access point described with respect to any of FIGS. 8-26.

Exemplary access point 2700 includes a processor 2702, e.g., a CPU, a wireless interface 2704, a network interface 2706, an assembly of hardware components 2708, e.g., an assembly of circuits, an optional SIM card 2709, an I/O interface 2710, and memory 2712 coupled together via a bus 2714 over which the various elements may interchange data and information.

Access point 2700 further includes a plurality of I/O devices (speaker 2738, switches 2740, mouse 2742, keyboard/keypad 2744, and display 2746, e.g., touch screen display, coupled to I/O interface 2710. Network interface 2706, e.g., a wired or optical interface, includes a receiver 2722 and a transmitter 2724. In some embodiments, the receiver 2722 and transmitter 2724 as included as part of a transceiver 2720, e.g., a transceiver chip. The network interface 2706 couples the access point 2700 to other network nodes and/or the Internet. Wireless interface 2704 includes a wireless receiver 2726 and a wireless transmitter 2728. Wireless transmitter 2728 is coupled to a plurality of transmit antennas (2734, . . . , 2736) via which the access point transmits downlink signals to wireless stations including resource allocations, downlink data signals, and acknowledgments, e.g. acknowledgments to TB frames from host STAs and guest STAs. Wireless receiver 2726 is coupled to a plurality of receive antennas (2730, . . . , 2732) via which the access point receive signals from wireless stations including shared resource type trigger frames from host STAs, a TB frame (corresponding to a shared resource type trigger frame) from host STA including data on host user resource units, and a TB frame (corresponding to a shared resource type trigger frame) from a guest STA including data on shared resource units.

Memory 2712 includes an assembly of components 2716, e.g., an assembly of software components, and data/information 2718.

Figure 28A:
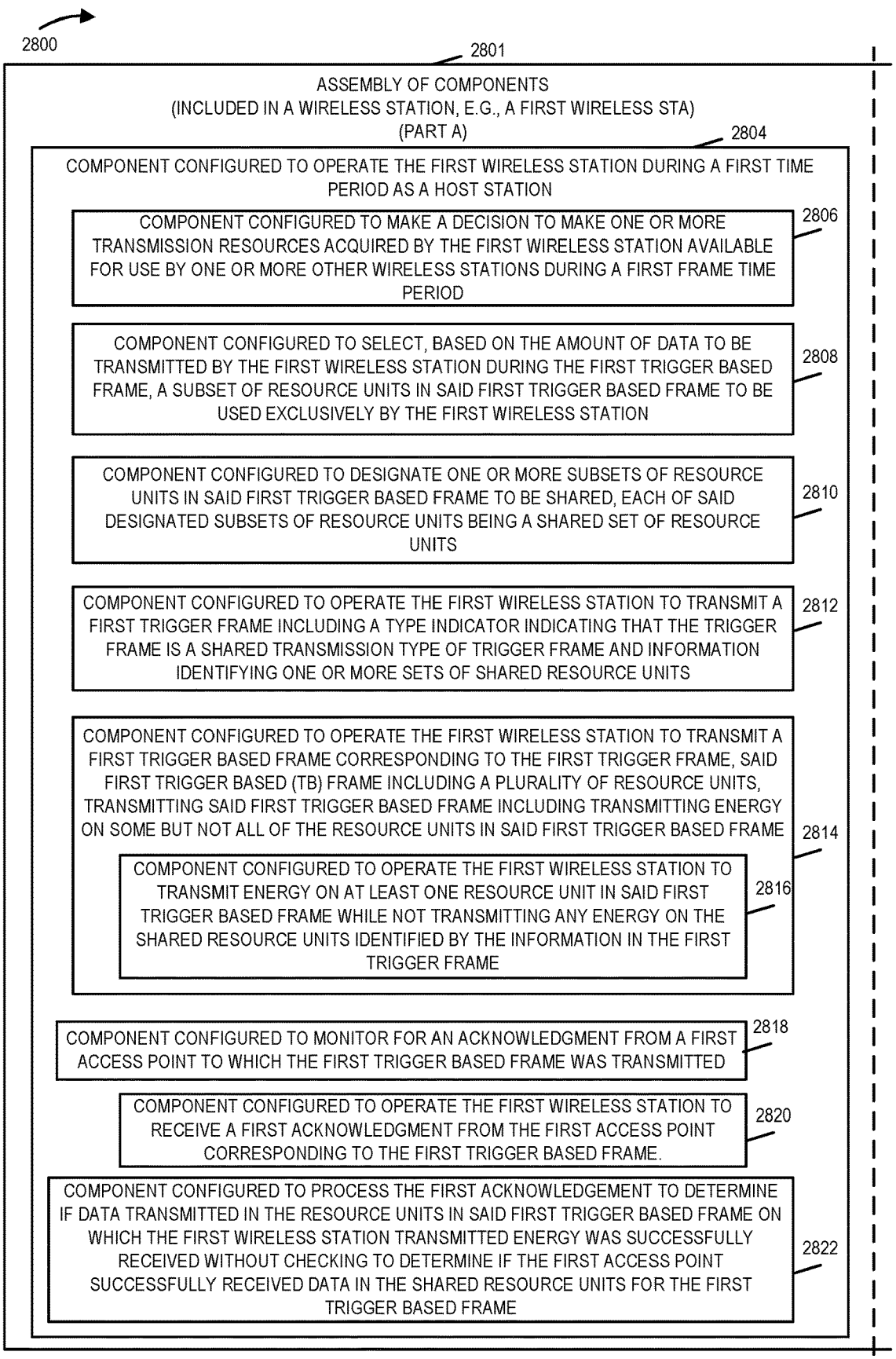
FIG. 28A is a first part of an assembly of components which may be included in an exemplary wireless station in accordance with an exemplary embodiment.
Figure 28B:
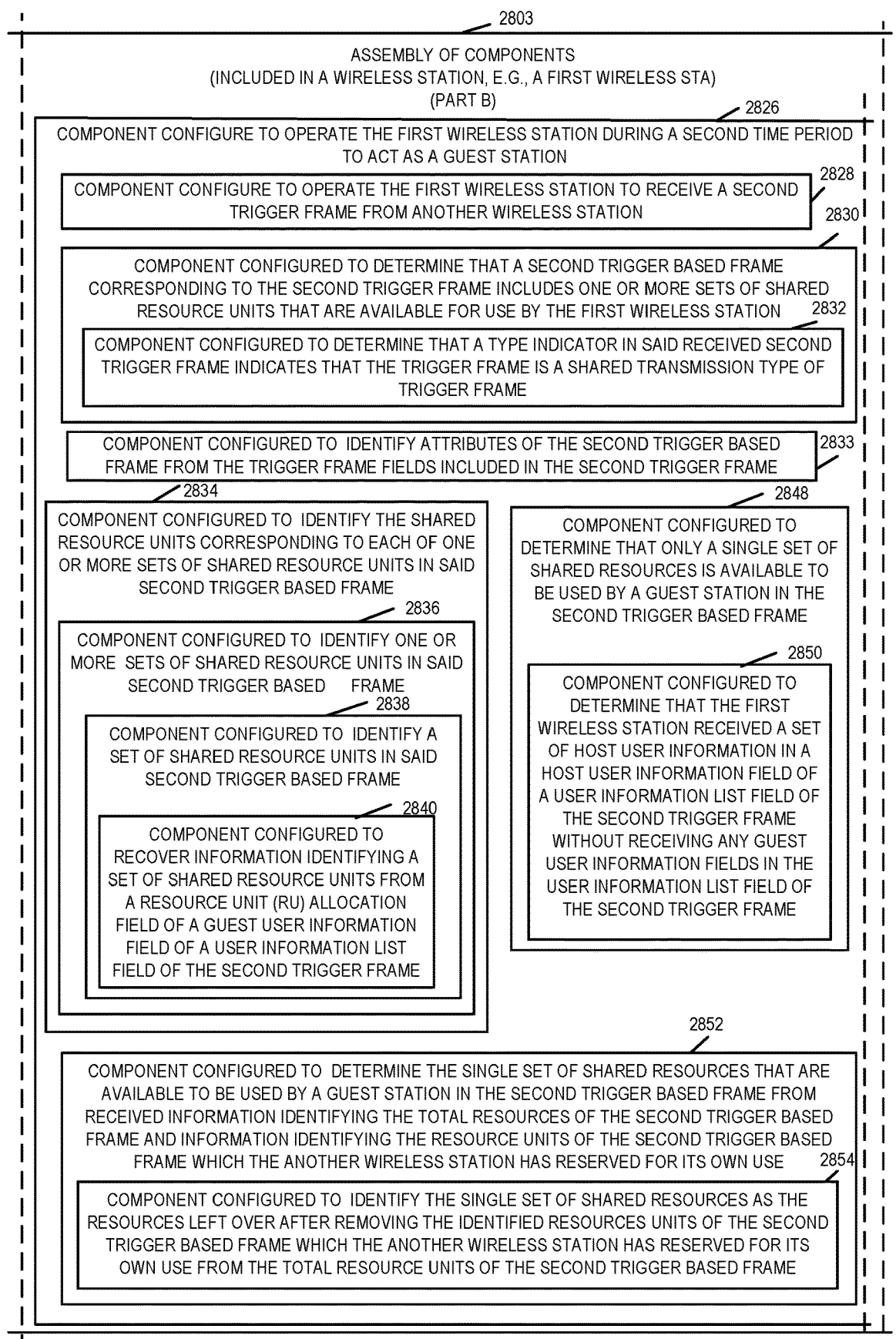
FIG. 28B is a second part of an assembly of components which may be included in an exemplary wireless station in accordance with an exemplary embodiment.
Figures 28, 28C:
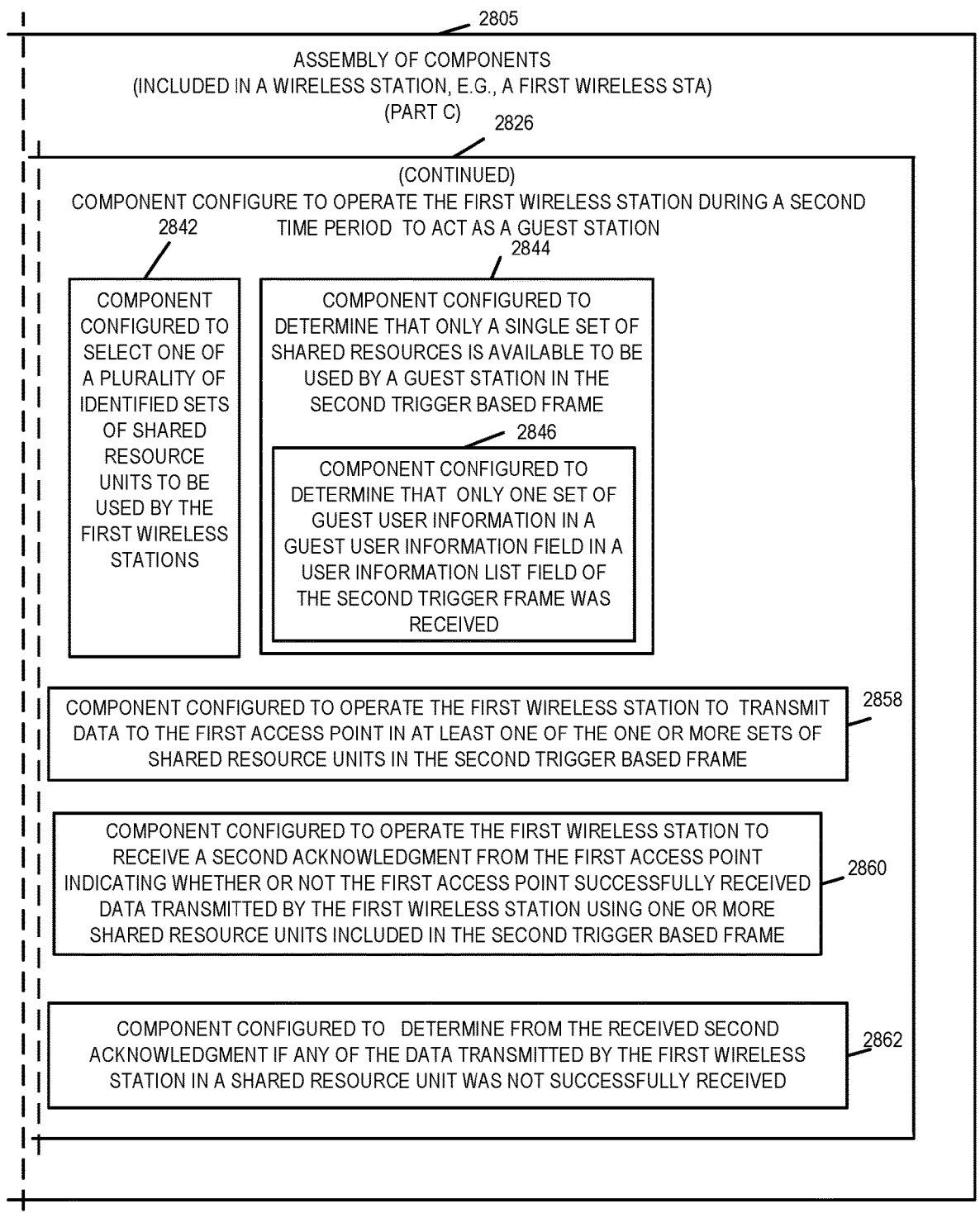
FIG. 28C is a third part of an assembly of components which may be included in an exemplary wireless station in accordance with an exemplary embodiment.
FIG. 28 comprises the combination of FIG. 28A, FIG. 28B and FIG. 28C.

FIG. 28, comprising the combination of FIG. 28A, FIG. 28B and FIG. 28C, is a drawing of an exemplary assembly of components 2800, comprising the combination of Part A 2801, Part B 2803 and Part C 2805, which may be included in a wireless station, e.g. wireless station 2600, e.g., a first wireless station, in accordance with an exemplary embodiment. Exemplary assembly of components 2800 may be, and sometimes is, included in an exemplary wireless station, e.g., exemplary wireless station 2600, e.g., the first wireless station implementing the method of flowchart 2400 of FIG. 24, any of the wireless stations of system 2500 of FIG. 25, and/or any of the wireless stations described with respect to any FIGS. 8-25 and FIG. 27. The components in the assembly of components 2800 can be, and in some embodiments are, implemented fully in hardware within the processor 2602, e.g., as individual circuits. The components in the assembly of components 2800 can, and in some embodiments are, implemented fully in hardware within the assembly of components 2608, e.g., as individual circuits corresponding to the different components. In other embodiments some of the components are implemented, e.g., as circuits, within the processor 2602 with other components being implemented, e.g., as circuits within assembly of components 2608, external to and coupled to the processor 2602. As should be appreciated the level of integration of components on the processor and/or with some components being external to the processor may be one of design choice. Alternatively, rather than being implemented as circuits, all or some of the components may be implemented in software and stored in the memory 2612 of the wireless station 2600 with the components controlling operation of the wireless station to implement the functions corresponding to the components when the components are executed by a processor, e.g., processor 2602. In some such embodiments, the assembly of components 2800 is included in the memory 2612 as assembly of components 2648. In still other embodiments, various components in assembly of components 2800 are implemented as a combination of hardware and software, e.g., with another circuit external to the processor providing input to the processor 2602 which then under software control operates to perform a portion of a component's function. While processor 2602 is shown in the FIG. 26 embodiment as a single processor, e.g., computer, it should be appreciated that the processor 2602 may be implemented as one or more processors, e.g., computers.

When implemented in software the components include code, which when executed by the processor 2602, configure the processor 2602 to implement the function corresponding to the component. In embodiments where the assembly of components 2800 is stored in the memory 2612, the memory 2612 is a computer program product comprising a computer readable medium comprising code, e.g., individual code for each component, for causing at least one computer, e.g., processor 2602, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 28 control and/or configure the wireless station 2600, or elements therein such as the processor 2602, to perform the functions of corresponding steps illustrated and/or described in the method of one or more of the flowcharts, signaling diagrams and/or described with respect to any of the Figures. Thus the assembly of components 2800 includes various components that perform functions of corresponding one or more described and/or illustrated steps of an exemplary method, e.g., steps of the method of flowchart 2400 of FIG. 24 and/or described or shown with respect to any of the other figures.

Assembly of components 2800 includes a component 2804 configured to operate the first wireless station during a first time period as a host station and a component 2826 configured to operate the first wireless station during a second time period to act as a guest station.

Component 2804 includes a component 2806 configured to make a decision to make one or more transmission requires acquired by the first wireless station available for use by one or more other wireless station during a first time period, a component 2808 configured to select, based on the amount of data to be transmitted by the first wireless station during the first trigger based frame, a subset of resource units in said first trigger based frame to be used exclusively by the first wireless station, a component 2810 configured to designate one or more subsets of resource units in said first trigger based frame to be shared, each of said designed subsets of resource units being a shared set of resource units, a component 2812 configured to operate the first wireless station to transmit a first trigger frame including a type indicator indicating that the trigger frame is a shared transmission type of trigger frame and information identifying one or more sets of shared resource units, and a component 2814 configured to operate the first wireless station to transmit a first trigger based frame corresponding to the first trigger frame, said first trigger based (TB) frame including a plurality of resource units, transmitting said first trigger based frame including transmitting energy on some but not all of the resource units in said first trigger based frame. Component 2814 includes a component 2816 configured to operate the first wireless station to transmit energy on at least one resource unit in said firsts trigger based frame while not transmitting any energy on the shared resource units identified by the information in the first trigger frame.

Component 2804 further includes a component 2818 configured to monitor for an acknowledgement from a first access point to which the first trigger based frame was transmitted, a component 2820 configured to operate the first wireless station to receive a first acknowledgment from the first access point corresponding to the first trigger based frame, and a component 2822 configured to process the first acknowledgment to determine if data transmitted in the resource units in said first trigger based frame on which the first wireless station transmitted energy was successfully received without checking to determine if the first access point successfully received data in the shared resource units for the first trigger based frame.

Component 2826 includes a component 2828 configured to operate the first wireless station to receive a second trigger frame from another wireless station, and a component 2830 configured to determine that a second trigger based frame corresponding to the second trigger frame includes one or more sets of shared resource units that are available for use by the first wireless station. Component 2830 includes a component 2832 configured to determine that a type indicator in said received second trigger frame indicates that the trigger frame is a shared transmission type of trigger frame. Component 2826 further includes a component 2833 configured to identify attributes of the second trigger based frame from the trigger frame fields included in the second trigger frame, and a component 2834 configured to identify the shared resource units corresponding to each of one or more sets of shared resource units in said second trigger based frame. Component 2834 includes a component 2836 configured to identify one or more sets of shared resource units in said second trigger based frame. Component 2836 includes a component 2840 configured to recover information identifying a set of shared resource units form a resource unit (RU) allocation field of a guest user information field of a user information list field of the second trigger frame.

Component 2826 further includes a component 2848 configured to determine that only a single set of shared resource is available to be used by a guest station in the second trigger based frame. Component 2848 includes a component 2850 configured to determine that the first wireless station received a set of host user information in a host user information field of the second trigger frame without receiving any guest user information fields in the user information list field of the second trigger frame.

Component 2826 further includes a component 2852 configured to determine the singe set of shared resource that are available to be used by a guest station in the second trigger based frame from received information identifying the total resources of the second trigger based frame and information identifying the resource units of the second trigger based frame which the another wireless station has reserved for its own use. Component 2852 includes a component 2854 configured to identify the single set of shared resources as the resources left over after removing the identified resource units of the second trigger based frame which the another user has reserved for its own use from the total resource units of the second trigger based frame.

Component 2826 further includes a component 2842 configured to select one of a plurality of identified sets of shared resource unit to be used by the first wireless station, and a component 2844 configured to determine that only a single set of shared resources is available to be used by a guest station in the second trigger based frame. Component 2844 includes a component 2846 configured to determine that only one set of guest user information in a guest user information field in a user information list field of the second trigger frame was received.

Component 2826 further includes a component 2856 configured to operate the first wireless station to transmit data to first access point in at least one of the one or more sets of shared resource units in the second trigger based frame, a component 2860 configured to operate the first wireless station to received a second acknowledgment form the first access point indicating whether or not the first access point successfully received data transmitted by the first wireless station using one or more shared resource units included in the second trigger based frame, and a component 2862 configured to determine from the received second acknowledgement if any of the data transmitted by the first wireless station in a shared resource unit was not successfully received.

NUMBERED LIST OF EXEMPLARY METHOD EMBODIMENTS

Method Embodiment 1 A method of operating a first wireless station, the method comprising: during a first time period, operating (2404) the first wireless station to act as a host station, operating as a host station including: making a decision (2406) to make one or more transmission resources acquired by the first wireless station (e.g., by successfully completing a listen before talk and acquiring the right to transmit or through other means such as by a resource grant to the host station) available for use by one or more other wireless stations a during a first frame time period; transmitting a first trigger frame (2412) including a type indicator indicating that the trigger frame is a shared transmission type of trigger frame and information identifying one or more sets of shared resource units (e.g., where shared resource units are resource units that are available for sharing and are thus available for use by other wireless stations); and transmitting (2414) a first trigger based (TB) frame corresponding to the first trigger frame, said first trigger based frame including a plurality of resource units, transmitting the first trigger based frame including transmitting energy on some but not all of the resource units in said first trigger based frame.

Method Embodiment 2 The method of Method Embodiment 1, wherein said information identifying one or more sets of shared resource units explicitly identifies resource units (e.g., by including one or more resource unit identifiers) of a first trigger based frame, corresponding to the first trigger frame, which are to be used as shared resource units.

Method Embodiment 3 The method of Method Embodiment 1, wherein said information identifying one or more sets of shared resource units identifies non-shared resource units of a first trigger based frame, corresponding to the first trigger frame, remaining units in the first trigger based frame beyond the non-shared resource units being shared resource units (thus in this case the information implicitly identifies the shared resource units by explicitly identify the non-shared resource units with the understanding that the omitted resource units are to be shared).

Method Embodiment 4 The method of Method Embodiment 1, wherein said first frame time period is the time period of the first trigger based frame.

Method Embodiment 5 The method of Method Embodiment 1, wherein said information identifying one or more sets of shared resources units includes information which explicitly identifies one or more sets of shared resource units which may be used by guest wireless stations.

Method Embodiment 6 The method of Method Embodiment 5, wherein said information explicitly identifying one or more sets of shared resource units which may be used by guest wireless stations includes one of more sets of guest information, each set of guest information including a RU allocation field indicating a set of shared resource units, each set of guest information being communicated in a Guest User Info field of a User Info List field of the first trigger frame.

Method Embodiment 7 The method of Method Embodiment 6, wherein said User Info List field of the first trigger frame includes a Host User Info field and one or more Guest User Info fields.

Method Embodiment 8 The method of Method Embodiment 7, wherein each of one or more guest information fields in the first trigger frame includes an AID12 field with its AID12 field value being a predetermined value.

Method Embodiment 9 The method of Method Embodiment 6, wherein said AID12 field value, which is used in each guest information field of the first trigger frame, equals 000000000000.

Method Embodiment 10 The method of Method Embodiment 1, wherein said information which can be used to identify one or more sets of shared resources units includes information identifying the total resources of the trigger based frame and information identifying the resource units of the trigger based frame which the first wireless station has reserved for its own use. (There is a single set of shared resource units in the first TB frame which may be used by a guest STA, where the single set of shared resource units is implicitly communicated by the host STA, which sends information in the first trigger frame identifying the total resource units of the first TB frame and resource units of the first TB frame allocated by the host STA to the host STA, with guest STAs and AP determining the single set of available guest STA resource units, e.g., by calculating: single set of guest STA resource units=total resource units for TB frame−resource units allocated by the host STA to the host STA.)

Method Embodiment 11 The method of Method Embodiment 10, wherein the information identifying the resource units of the trigger based frame which the first wireless station has reserved for its own use is communicated in a RU allocation field of a Host User Info field of a User Info List field of the first trigger frame.

Method Embodiment 12 The method of Method Embodiment 11, wherein the User Info List field of the first trigger frame includes a Host User Info field but does not include any guest User Info fields.

Method Embodiment 13 The method of Method Embodiment 12 wherein resource units of the trigger based frame corresponding to the first trigger frame which are not identified in the User Info List field of the first trigger frame are available for use as shared resource units.

Method Embodiment 14 The method of Method Embodiment 1, wherein operating as a host station further includes: selecting, (2408) based on the amount of data to be transmitted by the first wireless station during the first trigger based frame, a subset of resource units in said first trigger based frame to be used exclusively by the first wireless station; and designating (2410) one or more subsets of resource units in said first trigger based frame to be shared, each of said designated subsets of resource units being a set of shared resource units.

Method Embodiment 15 The method of Method Embodiment 1, wherein said decision to make one or more transmission resources acquired by the first wireless station available for use by one or more other wireless stations a during a first frame time period is a decision to participate in a shared transmission in which the host station will allow one or more wireless stations to operate as guest stations and use at least some of the shared transmission resources in the first trigger based frame while the first wireless stations exclusively uses one or more other resource units of the first trigger based frame to communicate data to a first access point.

Method Embodiment 16 The method of Method Embodiment 1, wherein transmitting (2414) a first trigger based frame corresponding to the first trigger frame includes transmitting (2416) energy on at least one resource unit in said first trigger based frame while not transmitting any energy on the shared resource units identified by the information in said first trigger frame.

Method Embodiment 17 The method of Method Embodiment 16, wherein operating (2404) the wireless station to act as a host station further includes: monitoring (2418) for an acknowledgement from a first access point to which said first trigger based frame is transmitted; and receiving (2420) a first acknowledgement from the first access point corresponding to the first trigger based frame.

Method Embodiment 18 The method of Method Embodiment 17, wherein said first acknowledgment includes an indication whether data was successfully received from the host station on one or more resource units on which the host station transmitted energy, wherein operating (2404) the wireless station to act as a host station further includes: processing (2422) the first acknowledgement to determine if data transmitted in the resource units in said first trigger based frame on which the first wireless station transmitted energy was successfully received without checking to determine if the first access point successfully received data in the shared resource units of the first trigger based frame.

Method Embodiment 19 The method of Method Embodiment 1, further comprising: during a second time period, operating (2426) the first wireless station to act as a guest station, operating the first wireless station as the guest station including: receiving (2428) a second trigger frame from another wireless station; determining (2430) that a second trigger based frame corresponding to the second trigger frame includes one or more sets of shared resource units that are available for use by the first wireless station; transmitting (2458) data to the first access point in at least one of the one or more sets of shared resource units included in the second trigger based frame.

Method Embodiment 20 The method of Method Embodiment 19, wherein determining (2430) that a second trigger based frame corresponding to the second trigger frame includes one or more set of shared resource units that are available for use by the first wireless station includes: determining (2432) that a type indicator in said received second trigger frame indicates that the trigger frame is a shared transmission type of trigger frame.

Method Embodiment 21 The method of Method Embodiment 19, wherein operating (2426) the first wireless station as a guest station further includes: identifying (2434) the shared resource units corresponding to each of one or more set of shared resources units in said second trigger based frame.

Method Embodiment 22 The method of Method Embodiment 21, wherein identifying (2434) the shared resource units corresponding to each of one or more set of shared resources units in said second trigger based frame includes: identifying (2438) a set of shared resource units in said trigger based frame.

Method Embodiment 23 The method of Method Embodiment 22, wherein identifying (2438) set of shared resource units in said trigger based frame includes: recovering (2440) information identifying a set of shared resource units from a RU allocation field of a Guest User information field of a User Info List Field of the second trigger frame.

Method Embodiment 24 The method of Method Embodiment 21, wherein said second trigger frame includes a User Info List field including a Host User Info field and one or more Guest User Info fields.

Method Embodiment 25 The method of Method Embodiment 21, wherein said second trigger based frame includes two or more sets of shared resource units; and wherein operating (2426) the first wireless station to act as a guest station further includes: selecting (2442) one of said sets of shared resources units to be used by the first wireless station.

Method Embodiment 26 The method of Method Embodiment 20, wherein operating (2426) the first wireless station to act as a guest station further includes: determining (2444 or 2448) that only a single set of shared resources is available to be used by a guest STA in the second trigger based frame.

Method Embodiment 27 The method of Method Embodiment 26, wherein said determining (2444) that only a single set of shared resources is available to be used by a guest STA in the second TB frame includes: determining (2446) that only one set of Guest User Information in a Guest User Info Field of a User Info List Field of said second Trigger Frame was received.

Method Embodiment 28 The method of Method Embodiment 27 further comprising: identifying (2338 and 2440) the single set of shared resource units in said trigger based frame from information included in the RU allocation field of the Guest User Info Field.

Method Embodiment 29 The method of Method Embodiment 26, wherein said determining (2448) that only a single set of shared resources is available to be used by a guest STA in the second TB frame includes: determining (2450) that receiving a set of Host User information in a Host User Info Field of a User Info List field of the second Trigger frame without receiving any Guest User Info fields in the User Info List field of the second Trigger frame.

Method Embodiment 30 The method of Method Embodiment 29, wherein operating (2426) the first wireless stations to act as a guest station further includes: determining (2452) the single set of shared resources that are available to be used by a guest STA in the second trigger based frame from received information identifying the total resources of the second trigger based frame and information identifying the resource units of the second trigger based frame which the another wireless station has reserved for its own use.

Method Embodiment 31 The method of Method Embodiment 30, wherein determining (2452) the single set of available guest STA resource units includes: identifying (2454) the single set of shared resources as the resources left over after removing the identified resource units of the second trigger based frame which the another wireless station has reserved for its own use from the total resource units of the trigger based frame.

Method Embodiment 32 The method of Method Embodiment 19, wherein operating (2426) as the first wireless station as the guest station further includes: receiving (2458) a second acknowledgement from the first access point indicating whether or not the first access point successfully received data transmitted by the first wireless station using one or more shared resource units included in the second trigger based frame.

Method Embodiment 33 The method of Method Embodiment 32, wherein operating (2426) as the first wireless station as the guest station further includes: determining (2462) from the received second acknowledgement if any of the data transmitted using a shared resource unit of the second trigger based frame was not successfully received (note that that the first wireless stations does this without checking or determining if data transmitted in non-shared resource units of the second trigger based frame were successfully received or acknowledged since such non-shared resource units of the second trigger based frame are not used by the first wireless station to communicate data)

Method Embodiment 34 The method of Method Embodiment 32, wherein operating (2426) the first wireless station as the guest station further includes: prior to transmitting (2458) data to the first access point in at least one of the one or more shared resource units included in the second trigger frame, identifying (2436) from information in the second trigger frame one or more sets of shared resource units that are included in the second trigger based frame.

Method Embodiment 35 The method of Method Embodiment 34, wherein operating (2426) the first wireless station as the guest station further includes: identifying (2433) attributes of the second trigger based frame (e.g., the TB frame duration, the number of non-legacy STF/LTF of the TB frame, RUs of all shared occasion) from trigger frame fields included in the second trigger frame.

Method Embodiment 36 The method of method embodiment 35, wherein operating (2426) the first wireless station as the guest station further includes: generating (1515) a trigger based frame in accordance with one or more of the identified attributes of the second trigger based frame, generating the trigger based frame including generating at least one legacy symbol, said at least one legacy symbol being a Legacy STF symbol, LTF symbol or SIG symbol and generating at least one non-legacy symbol, said non-legacy symbol being a non-legacy STF symbol or non-legacy LTF symbol; and transmitting (1516) the generated trigger based frame wherein transmitting the generated trigger based frame includes transmits the generated non-legacy symbol on the shared resources of the non-legacy STF or LTF portion of the generated trigger based frame (e.g. only transmits on the shared resources of the non-legacy STF/LTF).

NUMBERED LIST OF EXEMPLARY APPARATUS EMBODIMENTS

Apparatus Embodiment 1 A first wireless station (2600) comprising: a wireless transmitter (2624); a wireless receiver (2622); memory (2612); and a processor (2602) configured to: operate (2404) the first wireless station (2600), during a first time period, to act as a host station, operating as a host station including: making a decision (2406) to make one or more transmission resources acquired by the first wireless station (e.g., by successfully completing a listen before talk and acquiring the right to transmit or through other means such as by a resource grant to the host station) available for use by one or more other wireless stations a during a first frame time period; transmitting (2412) (via wireless transmitter 2624) a first trigger frame including a type indicator indicating that the trigger frame is a shared transmission type of trigger frame and information identifying one or more sets of shared resource units (e.g., where shared resource units are resource units that are available for sharing and are thus available for use by other wireless stations); and transmitting (2414) (via wireless transmitter 2624) a first trigger based (TB) frame corresponding to the first trigger frame, said first trigger based frame including a plurality of resource units, transmitting the first trigger based frame including transmitting energy on some but not all of the resource units in said first trigger based frame.

Apparatus Embodiment 2 The first wireless station of Apparatus Embodiment 1, wherein said memory includes a trigger type subfield encoding table which maps different trigger frame types to different predetermined values, one of said different trigger frame types being a shared resource trigger frame type. (For example, the table includes: trigger type subfield value=8 which maps to "Shared Transmission".)

Apparatus Embodiment 3 The first wireless station of Apparatus Embodiment 1, wherein said information identifying one or more sets of shared resource units explicitly identifies resource units (e.g., by including one or more resource unit identifiers) of a first trigger based frame, corresponding to the first trigger frame, which are to be used as shared resource units.

Apparatus Embodiment 4 The first wireless station of Apparatus Embodiment 1, wherein said information identifying one or more sets of shared resource units identifies non-shared resource units of a first trigger based frame, corresponding to the first trigger frame, remaining units in the first trigger based frame beyond the non-shared resource units being shared resource units (thus in this case the information implicitly identifies the shared resource units by explicitly identify the non-shared resource units with the understanding that the omitted resource units are to be shared).

Apparatus Embodiment 5 The first wireless station of Apparatus Embodiment 1, wherein said first frame time period is the time period of the first trigger based frame.

Apparatus Embodiment 6 The first wireless station of Apparatus Embodiment 1, wherein said information identifying one or more sets of shared resources units includes information which explicitly identifies one or more sets of shared resource units which may be used by guest wireless stations.

Apparatus Embodiment 7 The first wireless station of Apparatus Embodiment 6, wherein said information explicitly identifying one or more sets of shared resource units which may be used by guest wireless stations includes one of more sets of guest information, each set of guest information including a RU allocation field indicating a set of shared resource units, each set of guest information being communicated in a Guest User Info field of a User Info List field of the first trigger frame.

Apparatus Embodiment 8 The first wireless station of Apparatus Embodiment 7, wherein said User Info List field of the first trigger frame includes a Host User Info field and one or more Guest User Info fields.

Apparatus Embodiment 9 The first wireless station of Apparatus Embodiment 8, wherein each of one or more guest information fields in the first trigger frame includes an AID12 field with its AID12 field value being a predetermined value; and wherein said memory (2612) includes said AID12 field predetermined value to be included in the one or more guest information fields of the first trigger frame.

Apparatus Embodiment 10 The first wireless station of Apparatus Embodiment 7, wherein said AID12 field value, which is used in each guest information field of the first trigger frame, equals 000000000000.

Apparatus Embodiment 11 The first wireless station of Apparatus Embodiment 1, wherein said information which can be used to identify one or more sets of shared resources units includes information identifying the total resources of the trigger based frame and information identifying the resource units of the trigger based frame which the first wireless station has reserved for its own use. (There is a single set of shared resource units in the first TB frame which may be used by a guest STA, where the single set of shared resource units is implicitly communicated by the host STA, which sends information in the first trigger frame identifying the total resource units of the first TB frame and resource units of the first TB frame allocated by the host STA to the host STA, with guest STAs and AP determining the single set of available guest STA resource units, e.g., by calculating: single set of guest STA resource units=total resource units for TB frame−resource units allocated by the host STA to the host STA.)

Apparatus Embodiment 12 The first wireless station of Apparatus Embodiment 11, wherein the information identifying the resource units of the trigger based frame which the first wireless station has reserved for its own use is communicated in a RU allocation field of a Host User Info field of a User Info List field of the first trigger frame.

Apparatus Embodiment 13 The first wireless station of Apparatus Embodiment 12, wherein the User Info List field of the first trigger frame includes a Host User Info field but does not include any guest User Info fields.

Apparatus Embodiment 14 The first wireless station of Apparatus Embodiment 13 wherein resource units of the trigger based frame corresponding to the first trigger frame which are not identified in the User Info List field of the first trigger frame are available for use as shared resource units.

Apparatus Embodiment 15 The first wireless station of Apparatus Embodiment 1, wherein operating as a host station further includes: selecting, (2408) based on the amount of data to be transmitted by the first wireless station during the first trigger based frame, a subset of resource units in said first trigger based frame to be used exclusively by the first wireless station; and designating (2410) one or more subsets of resource units in said first trigger based frame to be shared, each of said designated subsets of resource units being a set of shared resource units.

Apparatus Embodiment 16 The first wireless station of Apparatus Embodiment 1, wherein said decision to make one or more transmission resources acquired by the first wireless station available for use by one or more other wireless stations a during a first frame time period is a decision to participate in a shared transmission in which the host station will allow one or more wireless stations to operate as guest stations and use at least some of the shared transmission resources in the first trigger based frame while the first wireless stations exclusively uses one or more other resource units of the first trigger based frame to communicate data to a first access point.

Apparatus Embodiment 17 The first wireless station of Apparatus Embodiment 1, wherein transmitting (2414) a first trigger based frame corresponding to the first trigger frame includes transmitting (2416) energy on at least one resource unit in said first trigger based frame while not transmitting any energy on the shared resource units identified by the information in said first trigger frame.

Apparatus Embodiment 18 The first wireless station of Apparatus Embodiment 17, wherein operating (2404) the wireless station to act as a host station further includes: monitoring (2418) for an acknowledgement from a first access point to which said first trigger based frame is transmitted; and receiving (2420) (via wireless receiver 2622) a first acknowledgement from the first access point corresponding to the first trigger based frame.

Apparatus Embodiment 19 The first wireless station of Apparatus Embodiment 18, wherein said first acknowledgment includes an indication whether data was successfully received from the host station on one or more resource units on which the host station transmitted energy, wherein operating (2404) the wireless station to act as a host station further includes: processing (2422) the first acknowledgement to determine if data transmitted in the resource units in said first trigger based frame on which the first wireless station transmitted energy was successfully received without checking to determine if the first access point successfully received data in the shared resource units of the first trigger based frame.

Apparatus Embodiment 20 The first wireless station of Apparatus Embodiment 1, wherein said processor is further configured to: operate (2426) the first wireless station, during a second time period, to act as a guest station, operating the first wireless station as the guest station including: receiving (2428) (via wireless receiver 2622) a second trigger frame from another wireless station; determining (2430) that a second trigger based frame corresponding to the second trigger frame includes one or more sets of shared resource units that are available for use by the first wireless station; transmitting (2458) (via wireless transmitter 2624) data to the first access point in at least one of the one or more sets of shared resource units included in the second trigger based frame.

Apparatus Embodiment 21 The first wireless station of Apparatus Embodiment 20, wherein determining (2430) that a second trigger based frame corresponding to the second trigger frame includes one or more set of shared resource units that are available for use by the first wireless station includes: determining (2432) that a type indicator in said received second trigger frame indicates that the trigger frame is a shared transmission type of trigger frame.

Apparatus Embodiment 22 The first wireless station of Apparatus Embodiment 20, wherein operating (2426) the first wireless station as a guest station further includes: identifying (2434) the shared resource units corresponding to each of one or more set of shared resources units in said second trigger based frame.

Apparatus Embodiment 23 The first wireless station of Apparatus Embodiment 22, wherein identifying (2434) the shared resource units corresponding to each of one or more set of shared resources units in said second trigger based frame includes: identifying (2438) a set of shared resource units in said trigger based frame.

Apparatus Embodiment 24 The first wireless station of Apparatus Embodiment 23, wherein identifying (2438) set of shared resource units in said trigger based frame includes: recovering (2440) information identifying a set of shared resource units from a RU allocation field of a Guest User information field of a User Info List Field of the second trigger frame.

Apparatus Embodiment 25 The first wireless station of Apparatus Embodiment 22, wherein said second trigger frame includes a User Info List field including a Host User Info field and one or more Guest User Info fields.

Apparatus Embodiment 26 The first wireless station of Apparatus Embodiment 22, wherein said second trigger based frame includes two or more sets of shared resource units; and wherein operating (2426) the first wireless station to act as a guest station further includes: selecting (2442) one of said sets of shared resources units to be used by the first wireless station.

Apparatus Embodiment 27 The first wireless station of Apparatus Embodiment 21, wherein operating (2426) the first wireless station to act as a guest station further includes: determining (2444 or 2448) that only a single set of shared resources is available to be used by a guest STA in the second trigger based frame.

Apparatus Embodiment 28 The first wireless station of Apparatus Embodiment 27, wherein said determining (2444) that only a single set of shared resources is available to be used by a guest STA in the second TB frame includes: determining (2446) that only one set of Guest User Information in a Guest User Info Field of a User Info List Field of said second Trigger Frame was received.

Apparatus Embodiment 29 The first wireless station of Apparatus Embodiment 28 wherein operating (2426) the first wireless station to act as a guest station further includes: identifying (2338 and 2440) the single set of shared resource units in said trigger based frame from information included in the RU allocation field of the Guest User Info Field.

Apparatus Embodiment 30 The first wireless station of Apparatus Embodiment 27, wherein said determining (2448) that only a single set of shared resources is available to be used by a guest STA in the second TB frame includes: determining (2450) that receiving a set of Host User information in a Host User Info Field of a User Info List field of the second Trigger frame without receiving any Guest User Info fields in the User Info List field of the second Trigger frame.

Apparatus Embodiment 31 The first wireless station of Apparatus Embodiment 30, wherein operating (2426) the first wireless station to act as a guest station further includes: determining (2452) the single set of shared resources that are available to be used by a guest STA in the second trigger based frame from received information identifying the total resources of the second trigger based frame and information identifying the resource units of the second trigger based frame which the another wireless station has reserved for its own use.

Apparatus Embodiment 32 The first wireless station of Apparatus Embodiment 31, wherein determining (2452) the single set of available guest STA resource units includes: identifying (2454) the single set of shared resources as the resources left over after removing the identified resource units of the second trigger based frame which the another wireless station has reserved for its own use from the total resource units of the trigger based frame.

Apparatus Embodiment 33 The first wireless station of Apparatus Embodiment 20, wherein operating (2426) as the first wireless station as the guest station further includes: receiving (2458) (via wireless receiver 2622) a second acknowledgement from the first access point indicating whether or not the first access point successfully received data transmitted by the first wireless station using one or more shared resource units included in the second trigger based frame.

Apparatus Embodiment 34 The first wireless station of Apparatus Embodiment 33, wherein operating (2426) as the first wireless station as the guest station further includes: determining (2462) from the received second acknowledgement if any of the data transmitted using a shared resource unit of the second trigger based frame was not successfully received (note that that the first wireless stations does this without checking or determining if data transmitted in non-shared resource units of the second trigger based frame were successfully received or acknowledged since such non-shared resource units of the second trigger based frame are not used by the first wireless station to communicate data)

Apparatus Embodiment 35 The first wireless station of Apparatus Embodiment 33, wherein operating (2426) the first wireless station as the guest station further includes: prior to transmitting (2458) data to the first access point in at least one of the one or more shared resource units included in the second trigger frame, identifying (2436) from information in the second trigger frame one or more sets of shared resource units that are included in the second trigger based frame.

Apparatus Embodiment 36 The first wireless station of Apparatus Embodiment 35, wherein operating (2426) the first wireless station as the guest station further includes: identifying (2433) attributes of the second trigger based frame (e.g., the TB frame duration, the number of (non-legacy) STF/LTF of the TB frame, RUs of all shared occasion) from trigger frame fields included in the second trigger frame.

Apparatus Embodiment 37 The first wireless station of apparatus embodiment 36, wherein the processor is further configures as part of operating (2426) the first wireless station as the guest station to control the first wireless station to: generate (1515) a trigger based frame in accordance with one or more of the identified attributes of the second trigger based frame, generating the trigger based frame including generating at least one legacy symbol, said at least one legacy symbol being a Legacy STF symbol, LTF symbol or SIG symbol and generating at least one non-legacy symbol, said non-legacy symbol being a non-legacy STF symbol or non-legacy LTF symbol; and transmit (1516) the generated trigger based frame wherein transmitting the generated trigger based frame includes transmits the generated non-legacy symbol on the shared resources of the non-legacy STF or LTF portion of the generated trigger based frame (e.g. only transmits on the shared resources of the non-legacy STF/LTF).

NUMBERED LIST OF EXEMPLARY NON-TRANSITORY

Computer Readable Medium Embodiments

Non-Transitory Computer Readable Medium Embodiment 1 A non-transitory computer readable medium including computer executable instructions which when executed by a processor of a first wireless station control the first wireless station to perform the steps of: during a first time period, operating (2404) the first wireless station to act as a host station, operating as a host station including: making a decision (2406) to make one or more transmission resources acquired by the first wireless station (e.g., by successfully completing a listen before talk and acquiring the right to transmit or through other means such as by a resource grant to the host station) available for use by one or more other wireless stations a during a first frame time period; transmitting a first trigger frame (2412) including a type indicator indicating that the trigger frame is a shared transmission type of trigger frame and information identifying one or more sets of shared resource units (e.g., where shared resource units are resource units that are available for sharing and are thus available for use by other wireless stations); and transmitting (2414) a first trigger based (TB) frame corresponding to the first trigger frame, said first trigger based frame including a plurality of resource units, transmitting the first trigger based frame including transmitting energy on some but not all of the resource units in said first trigger based frame.

The techniques of various embodiments may be implemented using software, hardware and/or a combination of software and hardware. Various embodiments are directed to apparatus, e.g., user devices such as a user equipment (UE) device, base stations such as a gNB or ng-eNB, network nodes, an AMF device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, gateways, servers, cable networks, cloud networks, nodes, servers, cloud service servers, customer premises equipment devices, controllers, network monitoring nodes/servers and/ or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first wireless station, the method comprising:
receiving a first trigger frame from another wireless station;
determining that a first trigger based frame corresponding to the first trigger frame includes one or more sets of shared resource units that are available for use by the first wireless station; and
operating the first wireless station to act as a guest station, wherein operating the first wireless station to act as a guest station includes:
transmitting data to a first access point in at least one of the one or more sets of shared resource units included in the first trigger based frame.

2. The method of claim 1 wherein the received first trigger frame includes a type indicator indicating that the first trigger frame is a shared transmission type of trigger frame.

3. The method of claim 2, wherein the received first trigger frame further includes information identifying one or more resource units in said first trigger based frame to be shared, said one or more resource units to be shared being shared resource units.

4. The method of claim 1, wherein operating the first wireless station to act as a guest station further includes:
receiving an acknowledgement from the first access point indicating whether or not the first access point successfully received data transmitted by the first wireless station using one or more shared resource units included in the first trigger based frame.

5. The method of claim 4, wherein operating the first wireless station to act as a guest station further includes:
prior to transmitting data to the first access point in at least one of the one or more shared resource units included in the first trigger based frame, identifying, from information in the first trigger frame, one or more sets of shared resource units that are included in the first trigger based frame.

6. The method of claim 5, wherein operating the first wireless station to act as a guest station further includes:
identifying attributes of the first trigger based frame from trigger frame fields included in the first trigger frame.

7. The method of claim 6, wherein operating the first wireless station to act as a guest station further includes:
generating a trigger based frame in accordance with one or more of the identified attributes of the first trigger based frame, wherein generating the trigger based frame includes generating at least one legacy symbol, said at least one legacy symbol being a Legacy STF symbol, a LTF symbol or a SIG symbol and generating at least one non-legacy symbol, said non-legacy symbol being a non-legacy STF symbol or non-legacy LTF symbol.

8. The method of claim 7, wherein operating the first wireless station to act as a guest station further includes:
transmitting the generated trigger based frame, wherein transmitting the generated trigger based frame includes transmitting the generated non-legacy symbol on the shared resources of the non-legacy STF or LTF portion of the generated trigger based frame.

9. A first wireless station comprising:
a wireless transmitter;
a wireless receiver;
memory; and
a processor configured to control the first wireless station to:
receive a first trigger frame from another wireless station;

determine that a first trigger based frame corresponding to the first trigger frame includes one or more sets of shared resource units that are available for use by the first wireless station; and act as a guest station by transmitting data to a first access point in at least one of the one or more sets of shared resource units included in the first trigger based frame.

10. The first wireless station of claim 9 wherein the received first trigger frame includes a type indicator indicating that the first trigger frame is a shared transmission type of trigger frame.

11. The first wireless station of claim 10, wherein the received first trigger frame further includes information identifying one or more resource units in said first trigger based frame to be shared, said one or more resource units to be shared being shared resource units.

12. The first wireless station of claim 9, wherein the processor is further configured to control the first wireless station to:

receive an acknowledgement from the first access point indicating whether or not the first access point successfully received data transmitted by the first wireless station using one or more shared resource units included in the first trigger based frame.

13. The first wireless station of claim 12, wherein the processor is further configured to control the first wireless station to:

identify, from information in the first trigger frame, one or more sets of shared resource units that are included in the first trigger based frame, prior to the first wireless station transmitting data to the first access point in at least one of the one or more shared resource units included in the first trigger based frame.

14. The first wireless station of claim 13, wherein the processor is further configured to control the first wireless station to:

identify attributes of the first trigger based frame from trigger frame fields included in the first trigger frame.

15. The first wireless station of claim 14, wherein the processor is further configured to control the first wireless station to:

generate a trigger based frame in accordance with one or more of the identified attributes of the first trigger based frame, wherein generating the trigger based frame includes generating at least one legacy symbol, said at least one legacy symbol being a Legacy STF symbol, a LTF symbol or a SIG symbol and generating at least one non-legacy symbol, said non-legacy symbol being a non-legacy STF symbol or non-legacy LTF symbol.

16. The first wireless station of claim 15, wherein the processor is further configured to control the first wireless station to:

transmit the generated trigger based frame, wherein transmitting the generated trigger based frame includes transmitting the generated non-legacy symbol on the shared resources of the non-legacy STF or LTF portion of the generated trigger based frame.

17. A non-transitory computer readable medium including computer executable instructions which when executed by a processor of a first wireless station control the first wireless station to perform the steps of:

receiving a first trigger frame from another wireless station;

determining that a first trigger based frame corresponding to the first trigger frame includes one or more sets of shared resource units that are available for use by the first wireless station; and operating the first wireless station to act as a guest station, wherein operating the first wireless station to act as a guest station includes:

transmitting data to a first access point in at least one of the one or more sets of shared resource units included in the first trigger based frame.

18. The non-transitory computer readable medium of claim 17 wherein the received first trigger frame includes a type indicator indicating that the first trigger frame is a shared transmission type of trigger frame.

19. The non-transitory computer readable medium of claim 18, wherein the received first trigger frame further includes information identifying one or more resource units in said first trigger based frame to be shared, said one or more resource units to be shared being shared resource units.

20. The non-transitory computer readable medium of claim 18, further comprising computer executable instructions which when executed by the processor of the first wireless station control the first wireless station to perform the step of:

receiving an acknowledgement from the first access point indicating whether or not the first access point successfully received data transmitted by the first wireless station using one or more shared resource units included in the first trigger based frame.

* * * * *